(12) United States Patent
Smith et al.

(10) Patent No.: US 12,473,983 B1
(45) Date of Patent: Nov. 18, 2025

(54) VARIABLE GEOMETRY VALVE SEAT SEAL FOR SIMULTANEOUS CONTACT AND RELEASE WITH VALVE BODY

(71) Applicant: DuraSeat LLC, Brookshire, TX (US)

(72) Inventors: Gordon Marlon Smith, Brookshire, TX (US); Logan Taylor Smith, Bellville, TX (US)

( * ) Notice: Subject to any disclaimer, the term of this patent is extended or adjusted under 35 U.S.C. 154(b) by 0 days.

(21) Appl. No.: 18/668,203

(22) Filed: May 19, 2024

(51) Int. Cl.
  *F16K 5/04* (2006.01)
  *F16K 5/18* (2006.01)

(52) U.S. Cl.
  CPC ............ *F16K 5/0478* (2013.01); *F16K 5/184* (2013.01)

(58) Field of Classification Search
  CPC ......... F16K 5/0478; F16K 5/184; F16K 5/185
  See application file for complete search history.

(56) References Cited

U.S. PATENT DOCUMENTS

| 6,089,543 A * | 7/2000 | Freerks | F16K 3/0227 251/356 |
| 2015/0184761 A1* | 7/2015 | Kusakabe | F16J 15/062 251/314 |

FOREIGN PATENT DOCUMENTS

GB          967008 A  *  8/1964  ........... F16K 5/0264

* cited by examiner

*Primary Examiner* — Hailey K. Do
(74) *Attorney, Agent, or Firm* — Adkins Legal Group

(57) ABSTRACT

The present invention includes a seat having an elastomeric seal and a core, the core having a groove disposed within the core forming a seal path, the seal path having a top centerline, a bottom centerline, an exposed edge, and a covered edge; the elastomeric seal is disposed within the groove; the elastomeric seal has a progressively varying seal protrusion height and protrusion width above the seat face and a progressively varying depth and width seal substructure below the seat face.

22 Claims, 20 Drawing Sheets

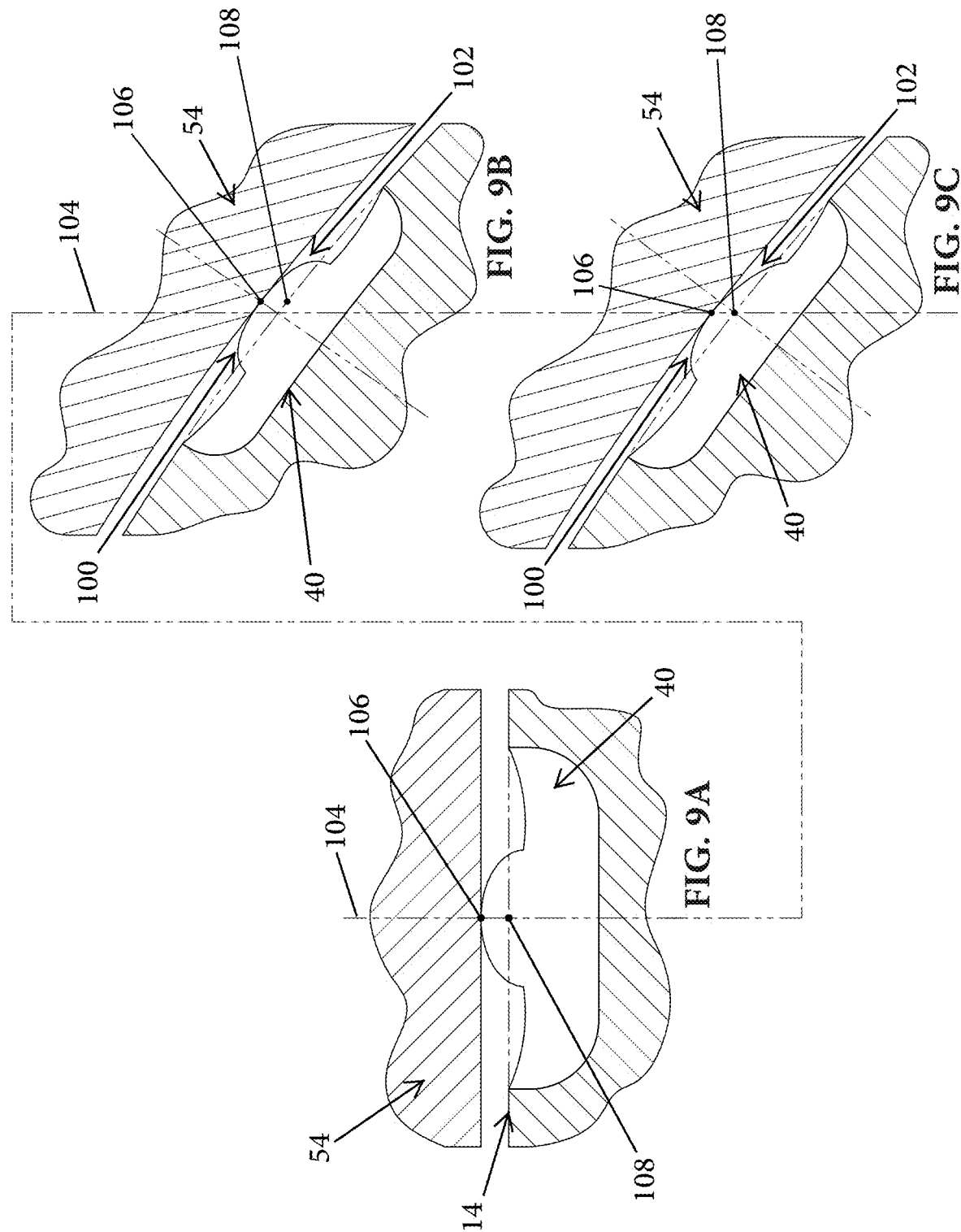

VARIABLE GEOMETRY VALVE SEAT SEAL FOR SIMULTANEOUS CONTACT AND RELEASE WITH VALVE BODY

CROSS-REFERENCE TO RELATED APPLICATIONS

This application claims priority to U.S. Provisional Application No. 63/503,469 filed May 20, 2023, which is incorporated herein by reference in its entirety.

STATEMENT REGARDING FEDERALLY FUNDED RESEARCH

None.

TECHNICAL FIELD OF THE INVENTION

The present invention relates in general to the field of valve seats, and more particularly, to the geometries of the seal and seal groove disposed within the valve seat.

BACKGROUND OF THE INVENTION

Without limiting the scope of the invention, its background is described in connection with existing valve seats, seals, and core geometries.

Current seats have a constant normal seal height design, meaning that the seal height is measured perpendicular to the seat face. In a constant normal seal height design, the seal height protrudes uniformly above the seat face causing the seal face radius to exceed the body bore radius. By virtue of this design, during seating, the seal edges are the first to contact the valve body followed by the seal centerline ends, top and bottom. During unseating, the seal centerlines top and bottom ends release first followed by the seal edges. This asynchronous contact and release gives rise to areas of restricted flow pinch points and promotes high velocity throttling, power washing, and entrained pipeline particulate impact.

Furthermore, current seats have constant seal protrusion widths and correspondingly, the seats have constant seal groove widths and depths along the entire seal path. These limitations lead to uneven seal load and weakens the seats, especially the seat edges.

Typically, a seal is flat or round in cross-sectional shape. A round shaped seal provides minimum seal contact and is prone to damage by entrained pipeline particulate, throttling, and power washing, ultimately causing decreased sealing capabilities and seal forgiveness. A flat shape seal provides more contact with the body bore but is usually ground flat with a grinding wheel and the undercut voids are often hand sculpted with a heated knife. Grinding the seal removes the tougher surface skin and sculpting the voids by hand creates inconsistency in the seal profile. The flat seal is prone to entrained pipeline particulate and dirt entrapment leading to leaks and minimizes forgiveness.

In view of the above discussion, it can be appreciated that it would be desirable to have alternative, more effective, seal geometries for seats.

SUMMARY OF THE INVENTION

The inventors have created a seal with a modified elliptical cross-sectional profile and a constant cross-sectional seal area. The seal has constantly varying normal seal heights and seal widths. This unique seal geometry provides simultaneous seal contact with the body bore and provides self-cleaning properties. The molded modified elliptical cross-sectional shape provides an enhanced seal with the body bore and maintains the tougher rubber skin surface, promoting nick, throttle and powerwash resistance while discouraging pipeline particulate entrapment and maximizing forgiveness.

In one embodiment, the present invention includes a seal for a valve seat for use in a plug valve, the seal comprising: a bonded side, a seat face side opposite the bonded side; a seal path that substantially follows the valve seat shape; a seal protrusion on the seat face side and a seal substructure on the bonded side; the seal protrusion having a variable height and a variable width along the seal path. In another aspect, the seal protrusion is generally elliptical in cross-sectional shape. In another aspect, the seal protrusion height is greatest at a top centerpoint and a bottom centerpoint of the valve seat. In another aspect, the seal protrusion height is lowest at an extreme exposed edge and an extreme covered edge of the valve seat. In another aspect, the seal protrusion height decreases at a constant rate from the top and bottom centerpoints toward the extreme exposed and extreme covered edges. In another aspect, the seal width is most narrow at the top centerpoint and the bottom centerpoint of the valve seat. In another aspect, the seal protrusion width is widest at the extreme exposed edge and the extreme covered edge of the valve seat. In another aspect, the seal has a constant cross-sectional area at all points about the seal path. In another aspect, the seal is symmetrical about a valve seat centerline. In another aspect, the seal substructure has a width, the seal substructure width varies inversely with the seal protrusion height at all points along the seal path. In another aspect, the seal is formed from an elastomer. In another aspect, the elastomer is one of Viton, VitonGF-600S, Viton Extreme ETP-600S, Viton GFLT-600S, DYNEON PFE40Z®, Kalrez®, FKM, or FFKM. In another aspect, the seal protrusion simultaneously contacts a valve body at all points along the seal path during seating. In another aspect, the seal protrusion simultaneously disengages from the valve body at all points along the seal path during unseating. In another aspect, the seal protrusion has a modified ellipse cross-sectional profile with a three-to-five-degree inward draft towards a seal centerline at the extreme covered and exposed edges. In another aspect, the seal protrusion has a true ellipse cross-sectional profile at the seal path intersection with the top and bottom centerpoint. In another aspect, the seal bonded to the valve seat.

In an additional embodiment, the present invention includes a plug valve seat assembly comprising: a valve seat having a plug communication side and a valve body communication side, the body communication side having a top and bottom centerpoint and an extreme exposed edge and an extreme covered edge; a seat face on the valve body communication side of the valve seat; a seal received within a groove, the groove disposed within the seat face on the valve body communication side and forming a seal path substantially following the valve seat shape; a seal protrusion on the valve body communication side and a seal substructure bonded within the groove; wherein the seal path intersects the top and bottom centerpoint and the extreme exposed and covered edges; wherein the seal protrusion has a variable height and a variable width along the seal path; wherein the groove has a variable depth below the seat face and a variable width along the seal path. In another aspect, the valve seat is one of round, venturi, or 4-way. In another aspect, the seal protrusion has a modified ellipse cross-sectional profile with a three-to-five-degree inward draft towards a seal centerline at the covered and exposed edges. In another aspect, the seal protrusion has a true ellipse cross-sectional profile at an intersection with the top and bottom centerpoint.

In yet another embodiment, the present invention includes a method of simultaneously sealing a plug valve along an entire seal path, the plug valve body including a pair of seats each seat having a seal, the method comprising the steps of forming a bubble tight seal to withstand the working pressure of a medium acting upon the seat when the plug valve is in the seated position, the seal formed by a seal protrusion with a constantly varying normal height and width and is symmetrical about a seat centerline, wherein each seal protrusion has a seal protrusion height that tapers from the valve seat centerline to an edge height, as each seal protrusion extends from upper and lower seal segments simultaneously to the covered and exposed edges; wherein each seal protrusion has a seal protrusion width that tapers from an edge width to the valve seat centerline; as each seal protrusion extends from covered and exposed edges simultaneously to the upper and lower seal segments.

BRIEF DESCRIPTION OF THE DRAWINGS

For a more complete understanding of the features and advantages of the present invention, reference is now made to the following figures. Matching reference numerals designate corresponding parts throughout the figures, which are not necessarily drawn to scale.

FIG. 9 shows the asymmetrical ellipse cross-sectional shape of the seal at the extreme seat edges.

DETAILED DESCRIPTION OF THE INVENTION

Figure 1A:
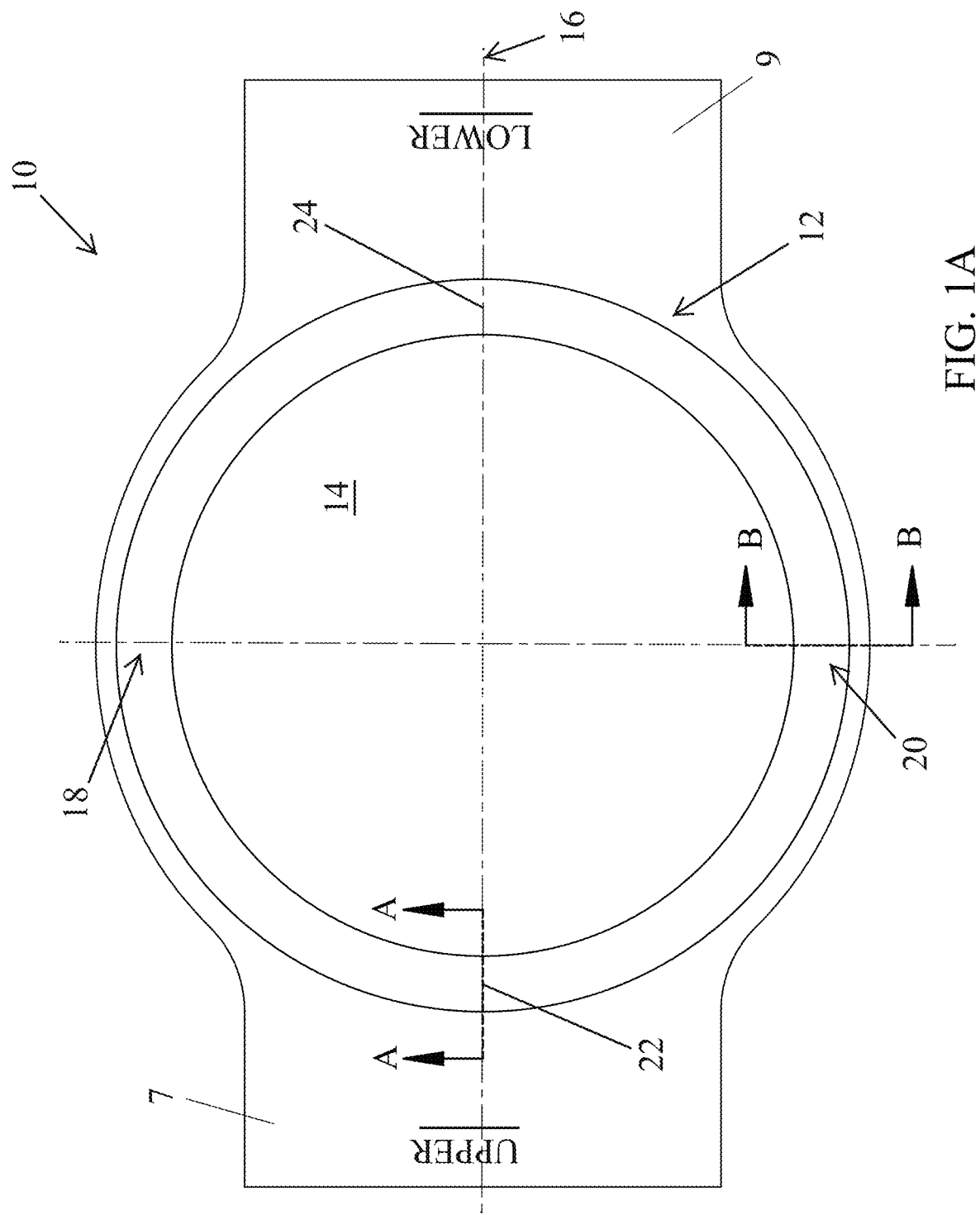
FIGS. 1A and 1B show plan and isometric cross-sectional views of the core with a groove disposed in the face of the core. The groove path is continuous around the groove centerline and the groove path substantially follows the shape of the core.

As described above, it would be desirable to have a seat with a variable seal geometry that allows simultaneous contact between the seat seal and the valve body bore, for example, in a double block and bleed valve system during the seating of the seats.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention.

As used herein, the term "body bore" and "body bore radius" means the inside diameter of the valve body against which seats compress to affect a bubble tight seal. The body bore is typically machined to very tight tolerances and displays a mirror like finish usually 32-64 RMS and are typically treated with an anti-corrosion surface treatment.

As used herein, the term "core" and "seat core" means the usually metallic substrate of the seat onto which the seal is bonded.

As used herein, the term "covered seal" means the right side or edge of the seat when viewed from the upstream and downstream pipeline, which is constantly shielded from flowing media during the seating/unseating and opening and closing quarter turn. The extreme covered seal or extreme covered edge is the point at which is furthest from the seal centerline on the right edge of the seat along the seal path and approximately equidistant from the top and bottom centerline. The extreme covered edge is on the axial or transverse centerline of the seat and seal As used herein, the term "elastomer" means a thermocuring polymer which is capable of undergoing a large elastic deformation, i.e., which can stretch and deform and is capable of returning substantially to its original form, without substantial permanent deformation, when the deformations cease. Exemplary elastomer substrates useful in the present invention include, but are not limited to, elastomers and elastomer composites or mixtures, and polymers and copolymers that exhibit elasticity. Elastomers useful in the present invention include, but are not limited to, thermoplastic elastomers, styrene materials, olefin materials, polyolefins, polyurethane thermoplastic elastomers, polyamides, synthetic rubbers, PDMS, polybutadiene, polyisobutylene, poly (styrene-butadiene-styrene), Polyurethane, polychloroprene, silicone, ethylene propylene diene (EPDM), nitrile rubber/Buna-N(NBR), (HNBR), styrene butadiene rubber (SBR), silicon rubber, butyl rubber, polybutadiene, fluorinated carbon-based synthetic rubbers (FKM)/(FPM), tetrafluoroethylene propylene (FEPM)/(TFE/P), perfluoroelastomer (FFKM). Kalrez®, fluorosilicone (FVMQ). In additional embodiments, the soft sealing material may be a plastic such as, tetrafluoroethylene (TFB), polytetrafluoroethylene (PTFE), modified PTFE (e.g., TFM, DYNEON® TFM 1600, DYNEON PFE407, DYNEON® TFM 1700), or reinforced polytetrafluoroethylene (RTFE). Viton® fluoroelastomers, Viton® APA fluoroelastomers (e.g., Viton Extreme ETP-600S, Viton GFLT-600S, Viton GBL-600S, Viton GF-600S, Viton GLT-600S), nylon plastics (e.g., NYLATRON®), polyaryletherketone (e.g., PAEK, polyether ether ketone (PEEK)), polyoxymethylene (e.g., POM, acetal, polyaceal, polyformaldehyde, DELRIN®, CELCON®, RAMTAL®, DURACON®, KEPITAL®, and HOSTAFORM®), reinforced TFM (e.g., TFM1600+20% GF), carbon filled PTFE, or polychlorotrifluoroethylene (e.g., PCTFB, PTFCE, KEL-F®)

As used herein, the term "exposed seal" means the seal on the left side or edge of the seat when viewed from the upstream and downstream pipeline which is constantly unprotected from flowing media during the opening and closing quarter turn. The extreme exposed seal or extreme exposed edge is the point at which is furthest from the seal centerline on the left side of the seat along the seal path and approximately equidistant from the top and bottom centerline. The extreme exposed edge is on the axial or transverse centerline of the seat and seal.

As used herein, the term "fluid" or "media" means a substance that has no fixed shape and yields easily to external pressure. Fluids may take a liquid form, a gaseous form, or combinations thereof, and often may include some solid material. Embodiments of the present disclosure may be utilized to control fluid flow in a system operated at normal environmental conditions and/or in high/low pressure and/or high/low temperature systems. In some embodiments, such systems may include industrial applications (e.g., power plants, processing systems, mineral extraction, pipeline, storage tanks, refineries, fuel distribution, and fuel measurement, etc.), vehicles (e.g., ships, tankers, submarines, locomotives, etc.), or control systems (e.g., hydraulic systems, pneumatic systems, etc.).

As used herein, the term "gasket factor" or "factor m" as defined by ASME, means the multiplier applied to the value of the internal fluid pressure to obtain the necessary working gasket seating pressure. The maintenance "factor m" is dimensionless.

As used herein, the term "groove" means a depression molded or machined into the core face capable of accepting the elastomeric seal. The groove generally follows the perimeter of the seat core. The groove varies in width and depth below the core face along the groove path. The groove maintains a constant cross-sectional area throughout its perimeter, thus providing uniform gasket factor.

As used herein, the term "groove path" means the channel disposed in the core face. The groove path generally mimics the shape of the core about the core's perimeter. The groove path mimics the shape of the core, e.g., an elongated (venturi) corm has an elongated groove path, a round core has a round projected groove path, a 4-way diverter core has a shape conducive to diverting flow. The groove path is able to accept the seal substructure. The groove path is top to bottom centerline symmetrical.

As used herein, the term "nesting" or "nesting voids" means the void into which the incompressible seal deforms during seating.

As used herein, the term "normal seal height" means the seal height above the seat face as measured perpendicular to core face surface.

As used herein, the term "power washing" means the removal of surface material by means of high velocity fluid impact.

As used herein, the term "projected" means a geometric term describing groove depth or seal height measured in line with the seat movement/wedging action in and out as a result of the plug movement.

As used herein, the term "projected seal height" means the seal height above the seat face. The projected seal height is measured in line with seat expansion and retraction.

As used herein, the term "seal" means all the elastomer disposed in the seal protrusion and the seal substructure. The seal is disposed in a groove. The seal is positioned symmetrically about said groove path.

As used herein, the term "seal force" means forces acting on sealing devices. For example, the wedge force is the force exerted on the plug by the operator, the force is transferred from the plug onto the seats and pushes the seal onto the valve body. This force must compress the seal enough to account for any valve body imperfections to avoid leaks. Another force acting on the seal is hydrostatic end load/force is the force created by the internal pressure in the pipeline/valve system that tries to push the seal away from the body bore. The seal force must be greater than the hydrostatic end load to prevent a leak or blow out.

As used herein, the term "seal path" means the position of the seal around the perimeter of the seat face, generally following the shape of the seat. e.g., an elongated (venturi) core has an elongated seal path, a round core has a round projected seal path, a 4-way diverter core has a shape conducive to diverting flow. The seal path follows the groove path. The seal path is top to bottom centerline symmetrical.

As used herein, the term "seal protrusion" means the part of the seal above the core face. The shape of the seal protrusion is determined by the mold, in various embodiments the seal protrusion has a generally (modified) elliptical cross-sectional shape and varies in height and width along the seal path. The seal protrusion employs a constant cross-sectional area.

As used herein, the term "seal protrusion inward offset" means the shape of the protruding seal at the extreme seat edges is a modified ellipse with the cross-sectional area designed to favor the inward portion of the seal. This intentional inward draft of the seal profile accommodates the protected sealing compression as the seat moves towards the body. The inward offset tapers continuously and consistently along the seal path towards the top and bottom centerline where there is no inward offset of the seal protrusion. The shape is a true ellipse at the top and bottom centerline.

As used herein, the term "seal substructure" means the flexible connective bond, stress relief and foundation of the compliant seal to the rigid core. The portion of the seal disposed below the seat face within the groove and bonded to the core. The seal substructure varies in width and depth along the seal path and has a constant cross-sectional area.

As used herein, the term "seat" or "valve seat" means the core and seal after bonding of the elastomer to the core.

As used herein, the term "set" or "compression set" means the permanent deformation of an elastomer after removal of a force that was applied to the elastomer for an extended period of time.

As used herein, the term "shrink" or "shrinkage" means the dimensional loss in a molded elastomer that occurs during cooling after it has been removed from the mold. Elastomers have different shrinkage characteristics depending on the amount of expansion during cure, filler characteristics, crosslinking behavior, geometry of the molded part, and volatile loss of the elastomer. Shrinkage is caused by greater thermal expansion of the elastomer contained within the mold. Thus, during cooling the balance of the elastomer left captured in the mold is reduced. This causes the surface of the elastomeric seal to sink since the seal is bonded to the groove on three of its sides.

As used herein, the term "sink" means the subsidence of the un-bonded top surface of the elastomeric seal towards the seal bed as a result of shrink.

As used herein, the term "scuffing" means the wear caused onto the seal by the abrasion of the seal with the valve body during seating and unseating.

As used herein, the term "transverse pressure load" means crosswise distributed load due to pressurized media.

As used herein, the term "transverse stiffness" means the crosswise resistance to deflection of the seal protrusion when acted upon by a shearing force.

As used herein, the term "valve body" means the primary boundary of a pressure valve which serves as the framework for the valve assembly that holds the components together. The valve body is the first pressure boundary of a valve, it resists media pressure loads from connecting piping. The valve body connects the valve to inlet and outlet piping.

Figure 1B:
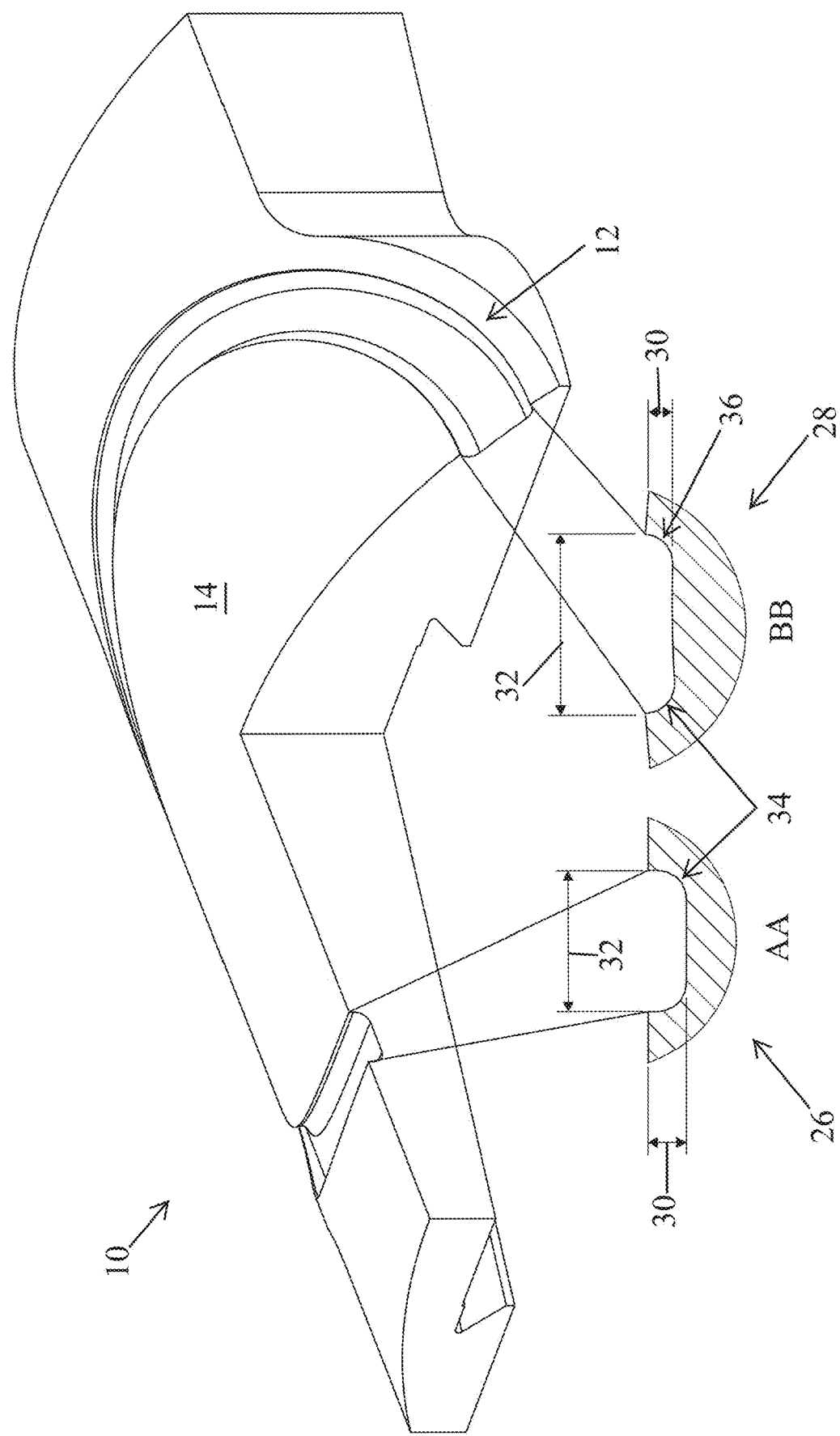

Turning now to the Figures, FIGS. 1A and 1B show a core 10 with a groove 12 disposed in the face 14 of the core. Beginning with FIG. 1A, the path of the groove 12 substantially follows the contour of the core 10. The groove 12 has been designed such that the cross-sectional area of the groove is constant while the depth and width of the groove continuously vary depending on the selected point along the groove path. The groove 12 is most narrow and most deep at the intersections of the groove path and the core centerline 16. The groove 12 is most wide and most shallow at the extreme covered edge 18 and the extreme exposed edge 20 of the core. Beginning at the top intersection 22 of the groove 12 and the core centerline 16, the narrowest and most deep groove location, and moving clockwise along the groove path towards the covered edge 18, the groove 12 continuously and simultaneously widens and becomes shallower until the groove 12 reaches the extreme covered edge 18, at the three o'clock position, where the groove 12 is widest and shallowest. Continuing clockwise along the groove path from the extreme covered edge 18 towards the bottom intersection 24, the groove 12 continuously and simultaneously narrows and deepens until crossing the bottom intersection 24 where the groove 12 is most narrow and most deep. Continuing clockwise along the groove path from the bottom intersection 24 towards the extreme exposed edge 20, the groove 12 continuously and simultaneously widens and becomes shallower until the groove 12 reaches the extreme exposed edge 20, where the groove 12 is widest and most shallow. Continuing clockwise along the groove path from the extreme exposed edge 20 towards the top intersection 22, the groove continuously and simultaneously narrows and becomes deeper until the groove 12 reaches the top intersection 22 where the groove is narrowest and deepest. The groove depths and widths are identical at the extreme exposed edge 20 and extreme covered edge 18 and at the top intersection 22 and bottom intersection 24. The groove depth and widths are equal at any first point along the groove path and the point at the mirror image of the first identified point. In other words, the groove is core centerline symmetrical.

The groove width is based on a projected groove width, thus the normal width is constantly changing while the projected width is constant.

FIG. 1B is an isometric view with quarter-sectioned cross-sectional view taken along lines AA and BB of FIG. 1A depicting the groove 12 as it is disposed within the face 14 of the core 10. The groove depth and width vary along the groove path. The top core centerline groove cross-section 26 shows the groove 12 where the groove depth 30 is deepest and groove width 32 is narrowest. Table 1 shows groove depths for various size and pressure class round, venturi, and 4-way seats. The bottom groove cross-section (not shown) has the same groove depth and width characteristics. The extreme exposed edge cross-section 28 shows the groove 12 where the groove depth 30 is shallowest and groove width 32 is widest. The extreme covered edge cross-section (not shown) has the same groove depth and width characteristics. Following the groove from the extreme exposed edge cross-section 28 towards the top groove cross-section 26 the groove 12 continuously and simultaneously narrows and becomes deeper until the groove 12 reaches the top groove cross-section 26 where the groove 12 is most narrow 32 and has the greatest depth 30. The variable width, depth, and shape of the seal bed enables improved seal stoutness, bondability, and seat edge strength.

TABLE 1

Groove depths of various sizes and pressure class seats.
All values in inches.

| | | Venturi | | | | | |
|---|---|---|---|---|---|---|---|
| | | T2" | T3" | T4" | T8" | T10" | T12" |
| Groove Depth | At Seal Centerline | 0.08 | 0.09 | 0.10 | 0.13 | 0.13 | 0.13 |
| | At Extreme covered & exposed edge | 0.07 | 0.08 | 0.08 | 0.10 | 0.10 | 0.11 |
| Groove Depth Taper | | 0.01 | 0.01 | 0.02 | 0.02 | 0.02 | 0.02 |

| | | Round | | | | | |
|---|---|---|---|---|---|---|---|
| | | H3" | H4" | H6" | H8" | H10" | H12" |
| Groove Depth | At Seal Centerline | 0.11 | 0.11 | 0.12 | 0.13 | 0.13 | 0.14 |
| | At Extreme covered & exposed edge | 0.09 | 0.09 | 0.10 | 0.10 | 0.10 | 0.11 |
| Groove Depth Taper | | 0.02 | 0.02 | 0.02 | 0.02 | 0.02 | 0.03 |

| | | 4-Way | | | |
|---|---|---|---|---|---|
| | | W2" | W4" | W6" | W8" |
| Groove Depth | At Seal Centerline | 0.19 | 0.25 | 0.24 | 0.25 |
| | At Extreme covered & exposed edge | 0.09 | 0.11 | 0.13 | 0.13 |
| Groove Depth Taper | | 0.10 | 0.14 | 0.11 | 0.12 |

The groove comprises an upper tapered groove segment 7 and a lower tapered groove segment 9, a covered tapered groove edge 18 and an exposed tapered edge 20; and wherein each tapered groove tapers from deeper to shallower from the upper and lower tapered groove segments to the covered and exposed tapered groove edges while simultaneously tapering from narrow to wider from upper tapered groove segment 7 and lower tapered groove segment 9 to the covered and exposed tapered groove edges. Table 2 shows groove widths for various size and pressure class round, venturi, and 4-way seats.

Additionally, the groove 12 utilizes continuous full radius inside corners 34 along the entirety of the groove 12. Full radius inside corners strengthens the seat most strategically at its thinnest sections, the seat edges, by maximizing the amount of core 10 fabrication material. Maintaining the thickness of the core 10 is especially important on the outboard extreme edge 36 of the groove 12. Utilizing the projected groove depth design and varying the groove depth 30 at the seat edges with full radius inside corner allows more core 10 material to support the edge load along with a vastly reduced stress concentration factor. This is especially important to low elongation, more brittle, core materials like ni-resist, iron and even ductile iron. The concern here is that cores are usually made from iron which means that instead of the weakened edges gently yielding the iron edges may suddenly crack, allowing leakage through the metallic portion of the seat.

The full radius inside corners 34 of the groove 12 increases the elastomer bonding three-fold, first by enhancing sand blast access during the preparation of the core 10, second, by eliminating a square corner which is difficult for rubber to flow into, eliminating small voids, and third limits the bonding agent meniscus build up in the corner which negatively affects bonding of the elastomer to the core 10.

TABLE 2

Groove widths of variou sizes and pressure class seats. All values in inches.

Venturi

|  |  | T2" | T3" | T4" | T8" | T10" | T12" |
|---|---|---|---|---|---|---|---|
| Groove Width | At Seal Centerline | 0.28 | 0.33 | 0.33 | 0.42 | 0.45 | 0.47 |
|  | At Extreme covered & exposed edge | 0.34 | 0.40 | 0.40 | 0.52 | 0.57 | 0.59 |
| Groove Width Taper |  | 0.06 | 0.07 | 0.07 | 0.10 | 0.12 | 0.12 |

Round

|  |  | H3" | H4" | H6" | H8" | H10" | H12" |
|---|---|---|---|---|---|---|---|
| Groove Width | At Seal Centerline | 0.43 | 0.43 | 0.47 | 0.49 | 0.50 | 0.52 |
|  | At Extreme covered & exposed edge | 0.54 | 0.52 | 0.59 | 0.64 | 0.64 | 0.68 |
| Groove Width Taper |  | 0.11 | 0.09 | 0.12 | 0.15 | 0.16 | 0.16 |

4-Way

|  |  | W2" | W4" | W6" | W8" |
|---|---|---|---|---|---|
| Groove Width | At Seal Centerline | 0.51 | 0.51 | 0.53 | 0.63 |
|  | At Extreme covered & exposed edge | 0.51 | 0.51 | 0.53 | 0.63 |
| Groove Width Taper |  | 0.00 | 0.00 | 0.00 | 0.00 |

Figure 2A:
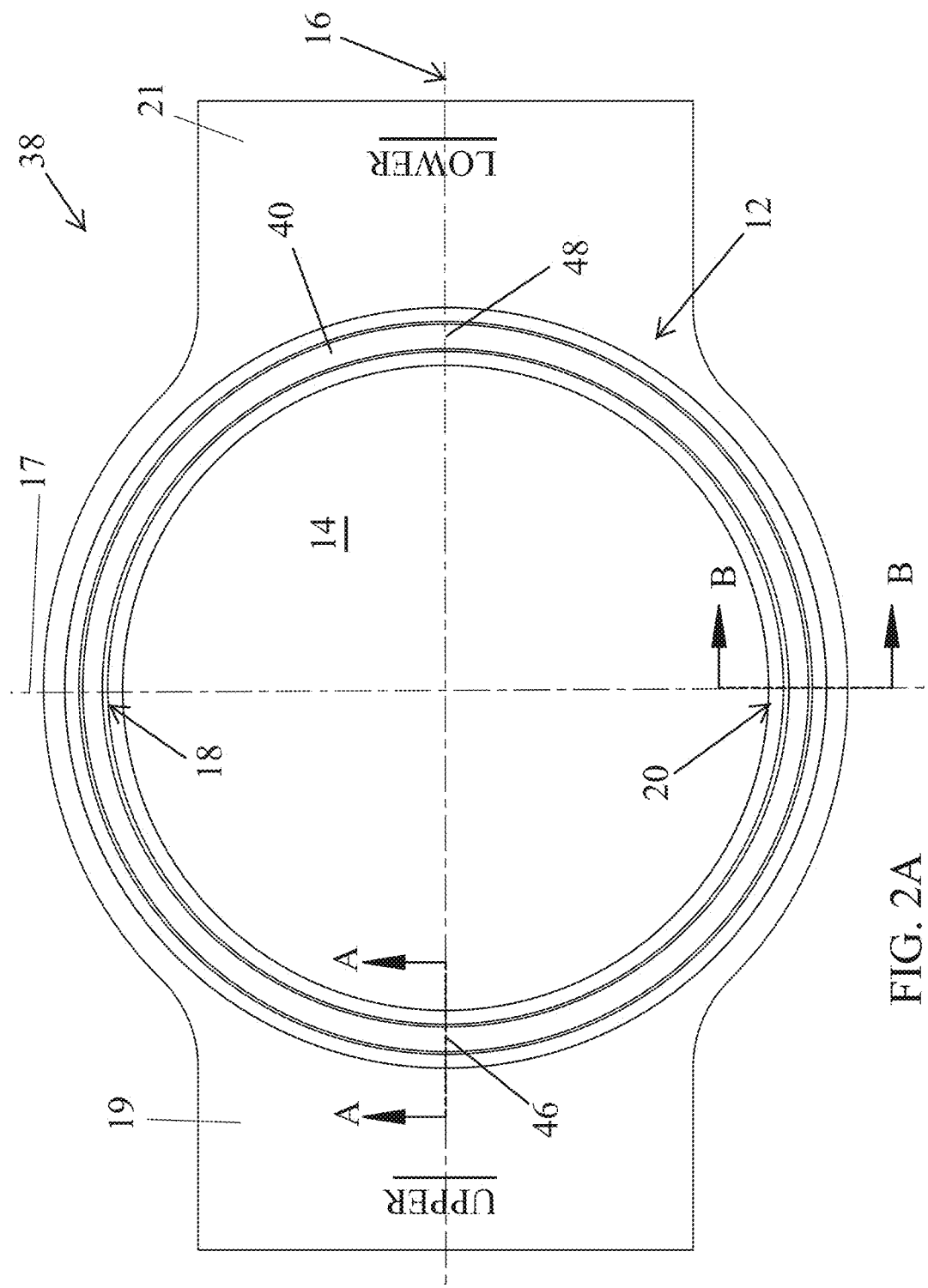
FIGS. 2A and 2B show plan and isometric cross-sectional views of the seat with the elastomeric seal bonded into the groove. The seal path substantially follows the groove which substantially follows the shape of the core.
Figure 2B:
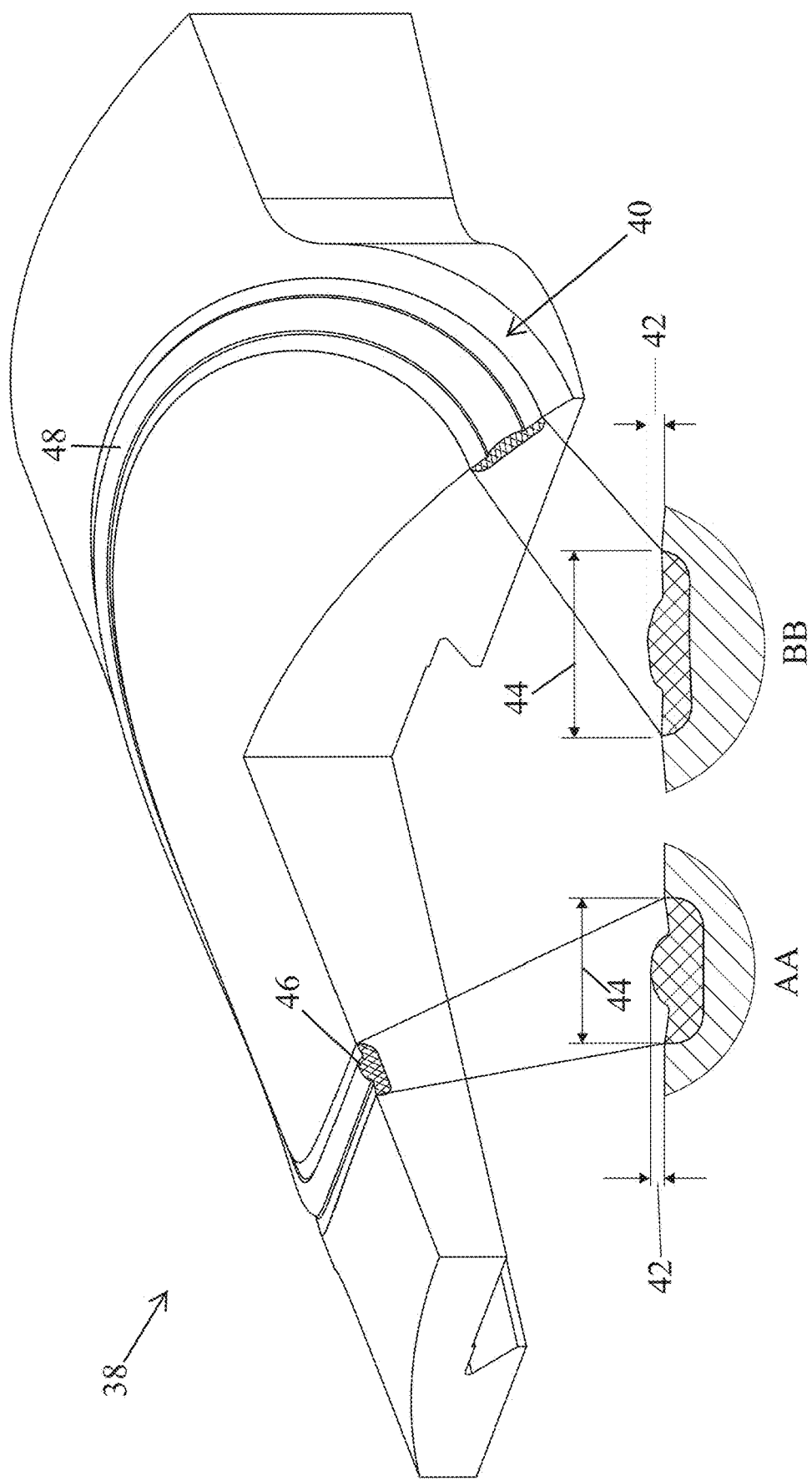

FIGS. 2A and 2B illustrate the seat 38 with a groove 12 disposed in the seat face 14 with an elastomeric seal 40 disposed and bonded to the groove 12. FIG. 2B is taken along lines AA and BB of FIG. 2A. FIGS. 2A and 2B illustrate the path of the seal 40 substantially mimics the groove 12 which substantially follows the contour of the core. The seal 40 has been designed such that the seal protrusion height 42 and seal protrusion width 44 vary inversely which provides a constant seal cross-section area along the entire seal path. The constant seal cross-sectional area maintains uniform seal loading in pounds/in² along the entire seal path, during seating.

The seal comprises an upper tapered seal segment 19 and a lower tapered seal segment 21, a covered tapered seal edge 18 and an exposed tapered seal edge 20; and wherein each tapered seal tapers from deeper to shallower from the upper and lower tapered seal segments to the extreme covered and exposed tapered seal edges while simultaneously tapering from narrow to wider from upper tapered seal segment and lower tapered seal segment to the extreme covered and exposed tapered seal edges.

Each tapered elastomeric seal tapers from thinner to wider from the upper and lower seal segments to the covered and exposed edges simultaneously at a rate that depends on the seal stoutness and seal height at the seal centerline. Each tapered elastomeric seal comprises: an upper seal segment 19, a lower seal segment 17, a covered edge 18 between the upper and lower seal segments, an exposed edge 20 between the upper and lower seal segments.

The seal protrusion height 42 has been designed such that the normal height of the seal is variable along the seal path and continuously changes from the top or upper seat longitudinal centerline intersection 46 and bottom or lower seat centerline intersection 48 with the longitudinal core centerline 16 to the extreme exposed edge 20 and extreme covered edge 18 at the axial or transverse centerline 17. The seal protrusion height 42 is greatest at the top seal intersection 46 and bottom seal intersection 48. The seal protrusion height 42 is smallest at the extreme exposed edge 20 and the extreme covered edge 18. The seal protrusion height 42 continuously varies as one travels along the seal path. The seal protrusion height 42 is equal at any first point along the seal path and the point at the mirror image of the first identified point. In other words, the seal 40 is core centerline 16 symmetrical both in the longitudinal and axial directions. The projected seal height design allows the seal to make and break seal contact, along the entire seal path, with the valve body simultaneously.

The seal protrusion height 42 is based on a projected seal protrusion height, thus the normal height is constantly changing while the projected height is constant.

The seal protrusion width 44 has been designed such that it is variable and continuously changing along the seal path. The seal protrusion width 44 is most narrow at the at the top seal intersection 46 and bottom seal intersection 48 and most wide at the extreme exposed edge 20 and the extreme covered edge 18. The seal protrusion width 44 continuously varies as one travels along the seal path. The seal protrusion width 44 is equal at any first point along the seal path and the point at the mirror image of the first identified point. In other words, the seal 40 is core centerline 16 symmetrical. The variable seal width design uniquely allows the seal 40 to make and break seal contact with the valve body simultaneously, along the entire seal perimeter while maintaining cross-sectional area and stiffness hence supporting seal protrusion height.

Figure 3:
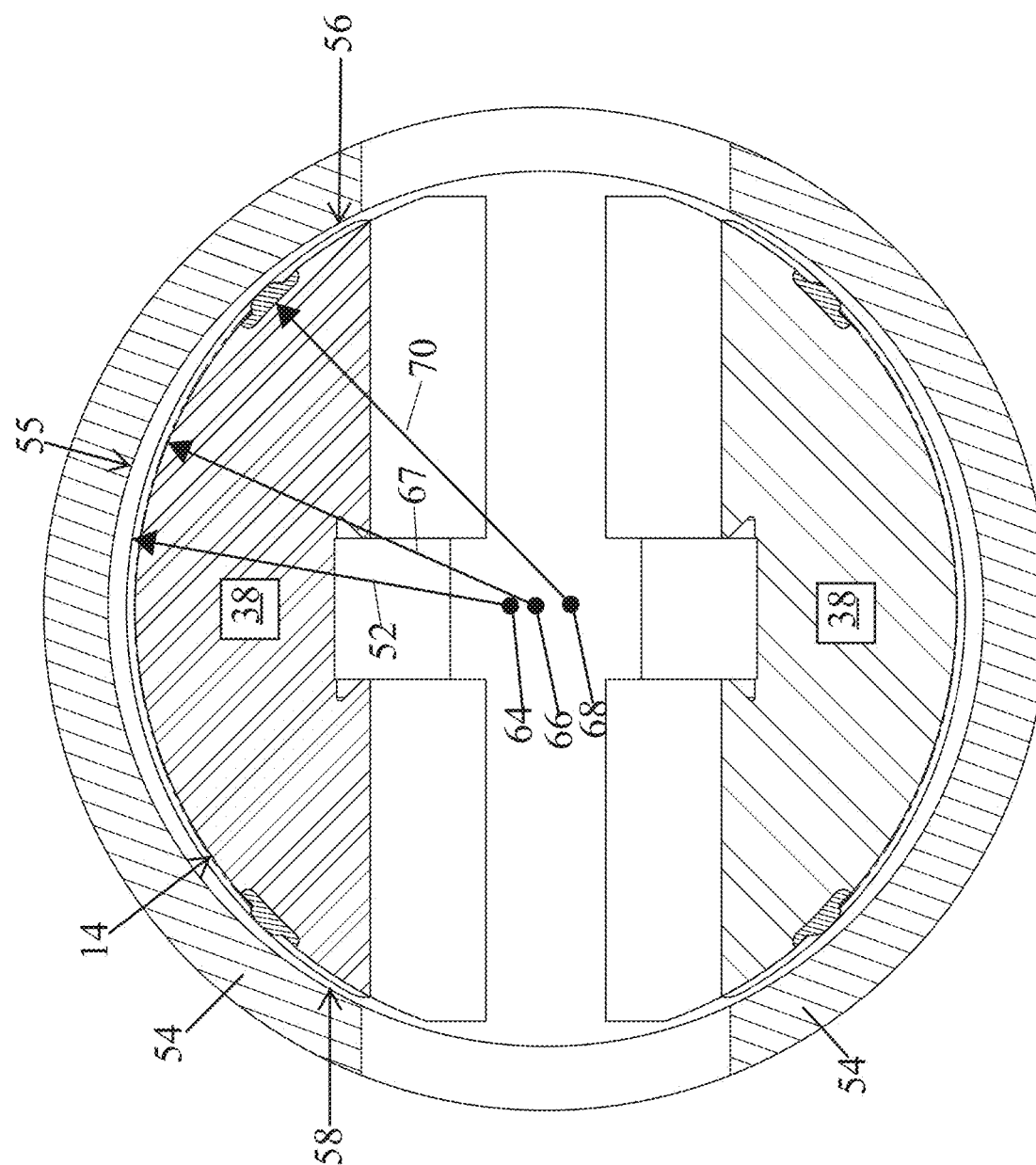
FIG. 3 shows a bottom view of a seat depicting the various radii of the core face profile, seal profile, bottom of groove profile, and the seat edges.

FIG. 3 shows a top view of the seats 38 and valve body 54 and more specifically, depicts the various radii of the seat 38. Utilizing the projected seal height design, the seal radius 52 matches the valve body bore radius 55. Equal seal and body bore radii uniquely yields simultaneous seal contact and release with the valve body 54 during seating and unseating, respectively. The projected seal height geometry is generated by offsetting the seal radius centerpoint 64 towards the seat face 14, thus projecting the seal protrusion height above the seat face 14 by the desired variable seal height. B y offsetting the seal radius centerpoint 64 outwardly toward the body bore from the face radius centerpoint 66, the seal protrusion above the seat face 14 is the greatest at the seal intersection with the top and bottom centerline of the valve seat 38. Conversely, the seal protrusion height above the seat face 14 is least at the exposed edge 56 and the covered edge 58. During the opening cycle of the valve, and following the right-hand rule, the covered edge 58 is on the left side of the seat 38 and the exposed edge 56 is on the right side of the seat 38. The exposed edge 56 and corresponding exposed seal, on the right side of the seat 38, is exposed to flowing media and entrapped pipeline particulates during the quarter turn valve openings and closings. The covered edge 58 and corresponding covered seal, on the left side of the seat 38, is covered and protected from flowing media impact by the valve body 54 and therefore less exposed to flowing media impact during valve opening and closing. On both the upstream and downstream seats, the exposed seal confronts more issues than the covered seal.

The seat face radius 67 originates from the face radius centerpoint 66. The radii of the seat face radius 67, the seal radius 52, the body bore radius 55, and the groove base radius 70 are all equal throughout the entire seal path. Further the centerpoints for the face radius centerpoint 66 and the body bore centerpoint (not shown) occupy the same space, i.e., they are overlapping. The face radius centerpoint 66 is on the horizontal/axial centerline (not shown) of the valve body 54 and is horizontal centerline symmetrical. The face radius centerpoint 66, the seal radius centerpoint 64, and the groove radius centerpoint 68 are on the longitudinal centerline (not shown) of the valve body 54 and all three centerpoints are vertical centerline symmetrical. The axial distance between the face radius centerpoint 66 and the seal radius centerpoint 64 is half as much as the distance between the face radius centerpoint 66 and the groove radius centerpoint 68.

The projected groove depth geometry is generated by offsetting the groove radius centerpoint 68 away from the seat face 14, thereby recessing the groove below the seat face 14 by the desired variable groove depth which also generates the groove base radius 70. This method of centerpoint offset recesses the normal groove depth below the seat face 14 by the greatest amount at the intersection with the top and bottom centerline of the valve seat. It should be noted that normal groove depth, of the prior art, diminishes while the projected groove depth stays constant.

Figure 4:
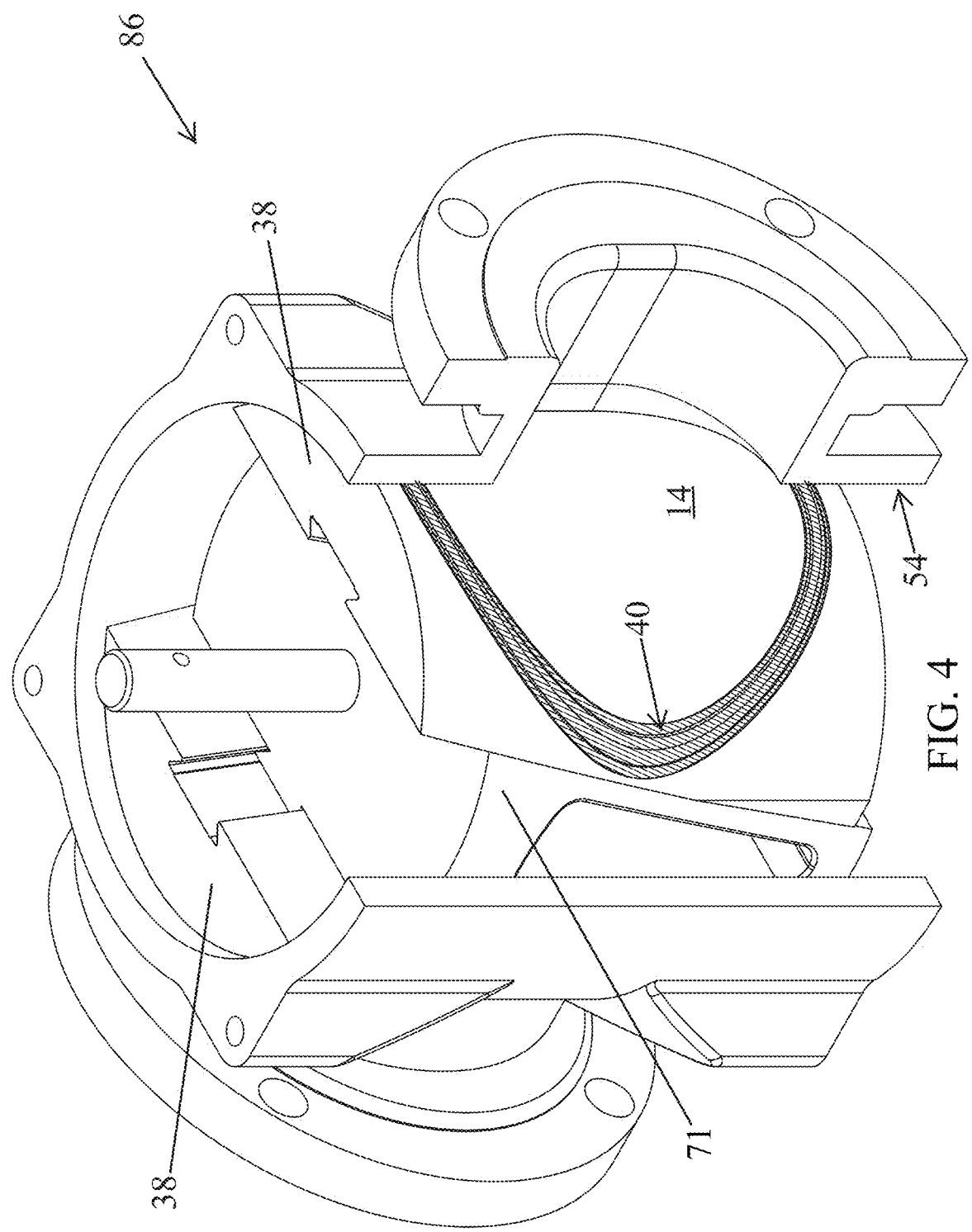
FIG. 4 shows a quarter section cut-away view of a valve assembly in the seated position.

FIG. 4 shows a cut-away view of a valve assembly 86 in a seated position. During seating, the valve plug 71 pushes the seats 38 outward toward the valve body 54. The entire perimeter of the seal 40 contacts the bore of the valve body 54 simultaneously; the seat 38 continues to be pushed outwardly until the seal 40 is nested into the nesting voids allowing for the metallic seat face 14 and the seat 38 to contact the metallic valve body 54 providing a fireproof barrier.

Figure 5A:
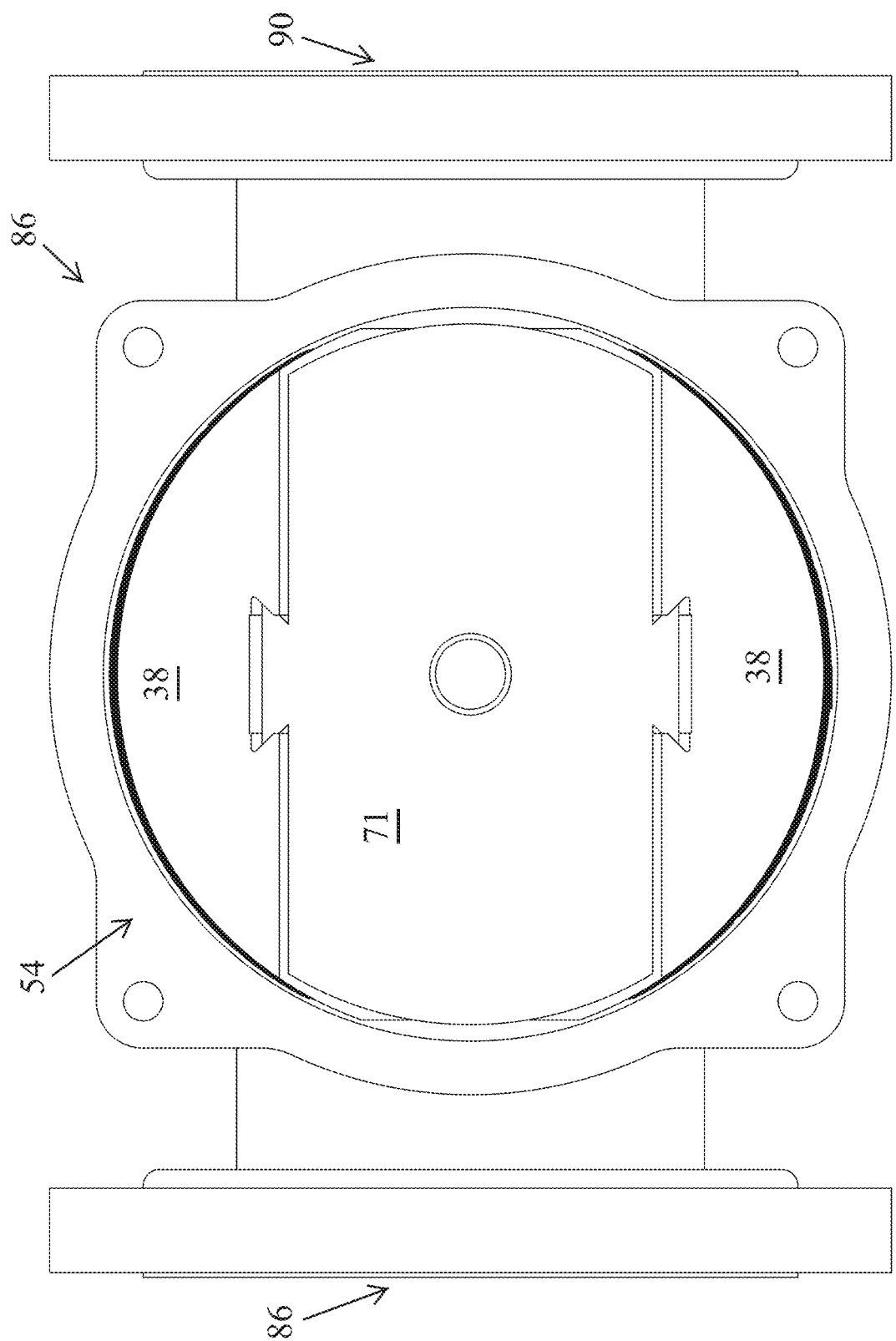
FIGS. 5A-5D show a top view of a valve assembly at various stages of seating.
Figure 5B:
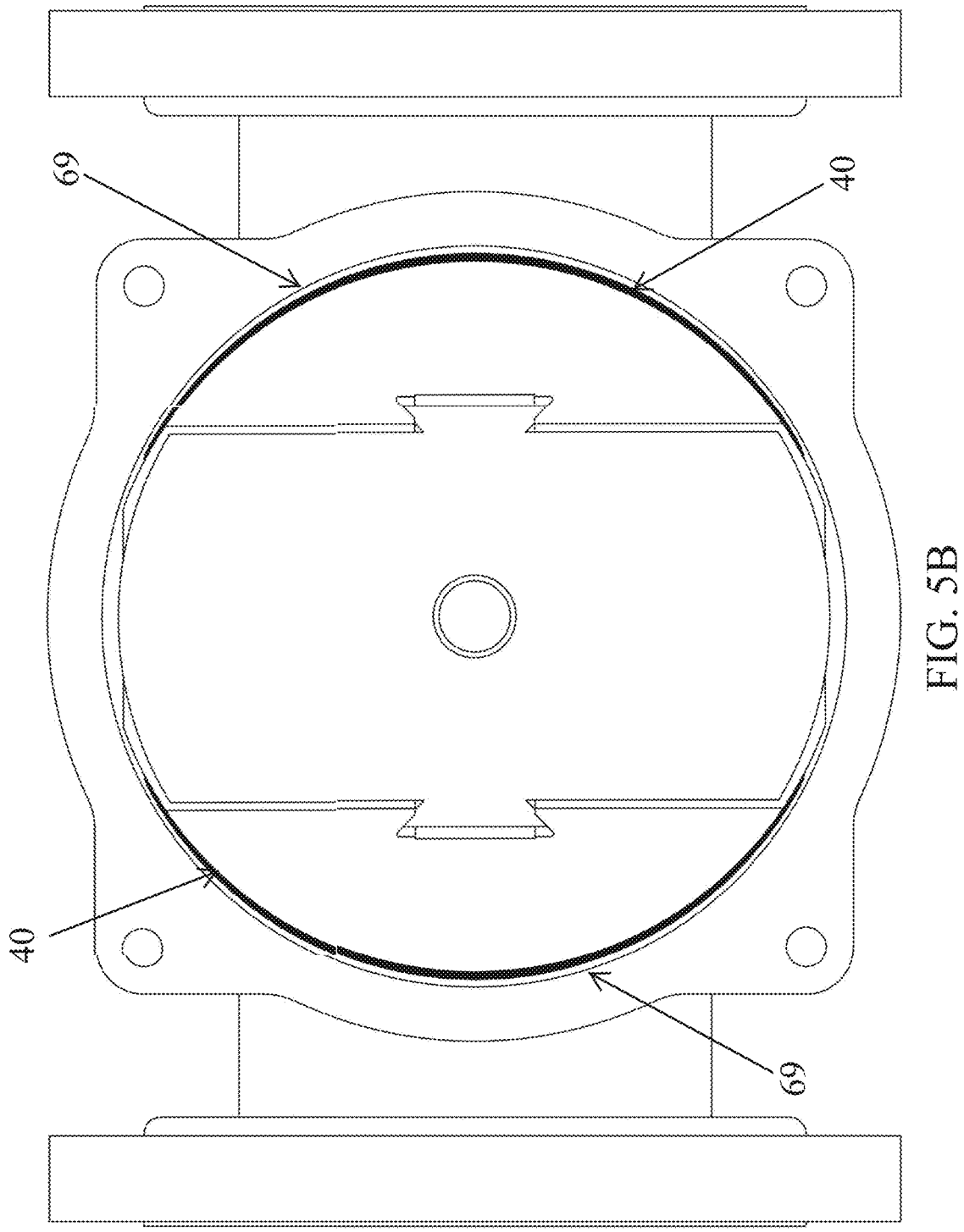
Figure 5C:
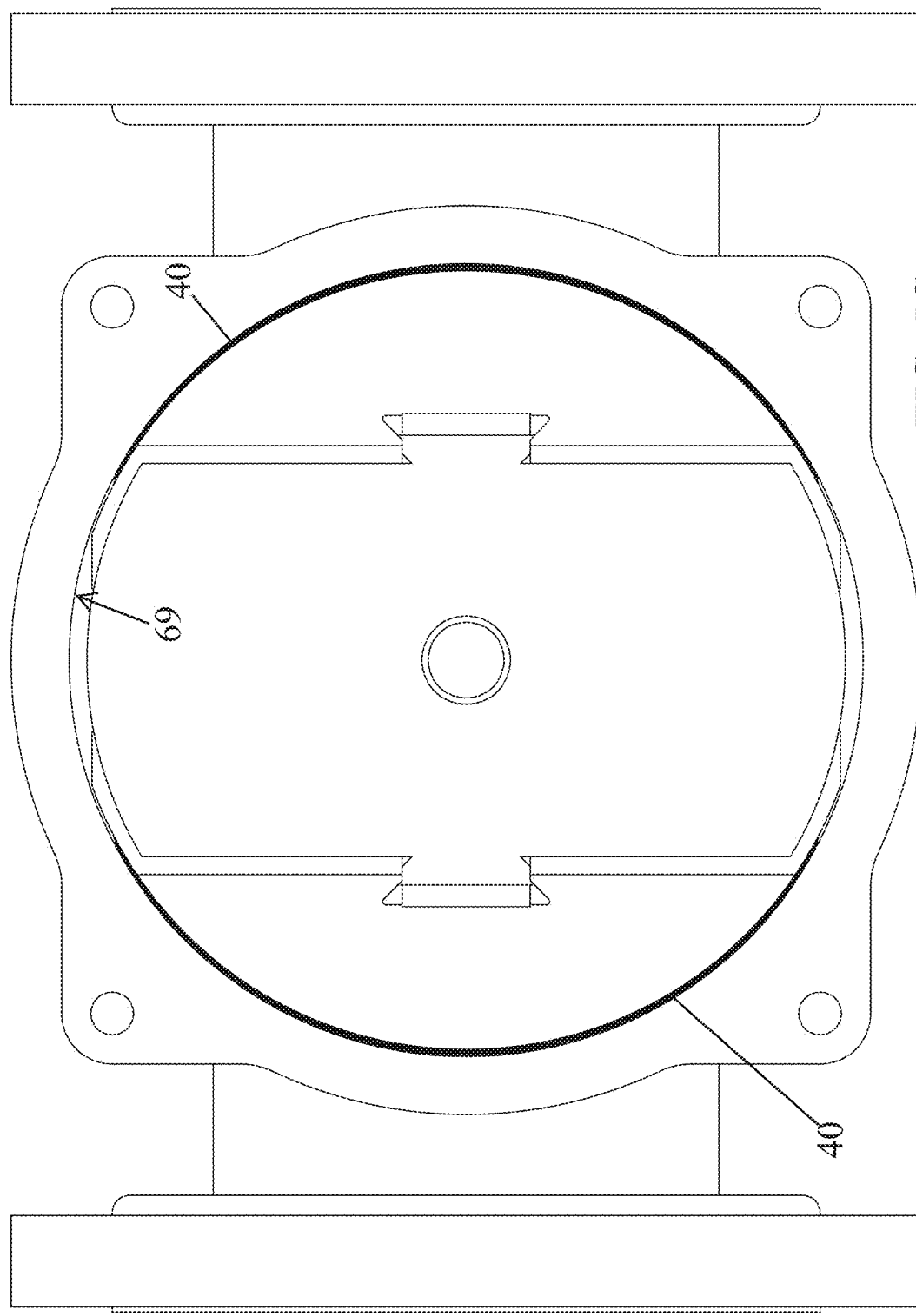

FIGS. 5A-5D show a top view of a double block and bleed valve in the open and various sequential valve closing positions. FIG. 5A shows the double block and bleed valve 86 in the open position, this is indicated by the valve body 54, the plug 71, the seats 38 out of line with the upstream 88 and downstream pipeline 90. Upon initiating a quarter turn valve closure operation, the seats 38 will be in-line with the upstream 88 and downstream pipeline 90, as shown in FIG. 5B. It can be appreciated to note the constant and equal clearance between the seal 40 and the body bore 69. This is due to the projected seal height design which constantly varies the height of the seal along the perimeter of the seal path. FIG. 5C shows the moment during the valve closing that the seal 40 makes initial contact with the body bore 69. Note the simultaneous contact of the seal 40 and the body bore 69 at all points along the seal perimeter. This simultaneous contact at all points along the seal path is accomplished due to the variable seal height along the seal path and the seal radius matching the body bore radius. The same simultaneous contact at all points along the seal path also occurs during the valve opening, but in reverse, thus there is simultaneous release of the seal along its entire perimeter from the body bore.

The simultaneous release minimizes high velocity throttling damage caused by pinch points. Pinch points happen when the seal 40 is still in contact with the body bore 69 at various points but also released at other points along the seal perimeter. Throttling and power washing, two detrimental flow forces, are also prevented by the simultaneous seal 40 pull off. Throttling results in the erosion of the seal due to high velocity, caused by pressure, of fluid on the seal. Also notice the constant gap or clearance is maintained between the face 14 of the seat 38 and the valve body bore 69.

Figure 5D:
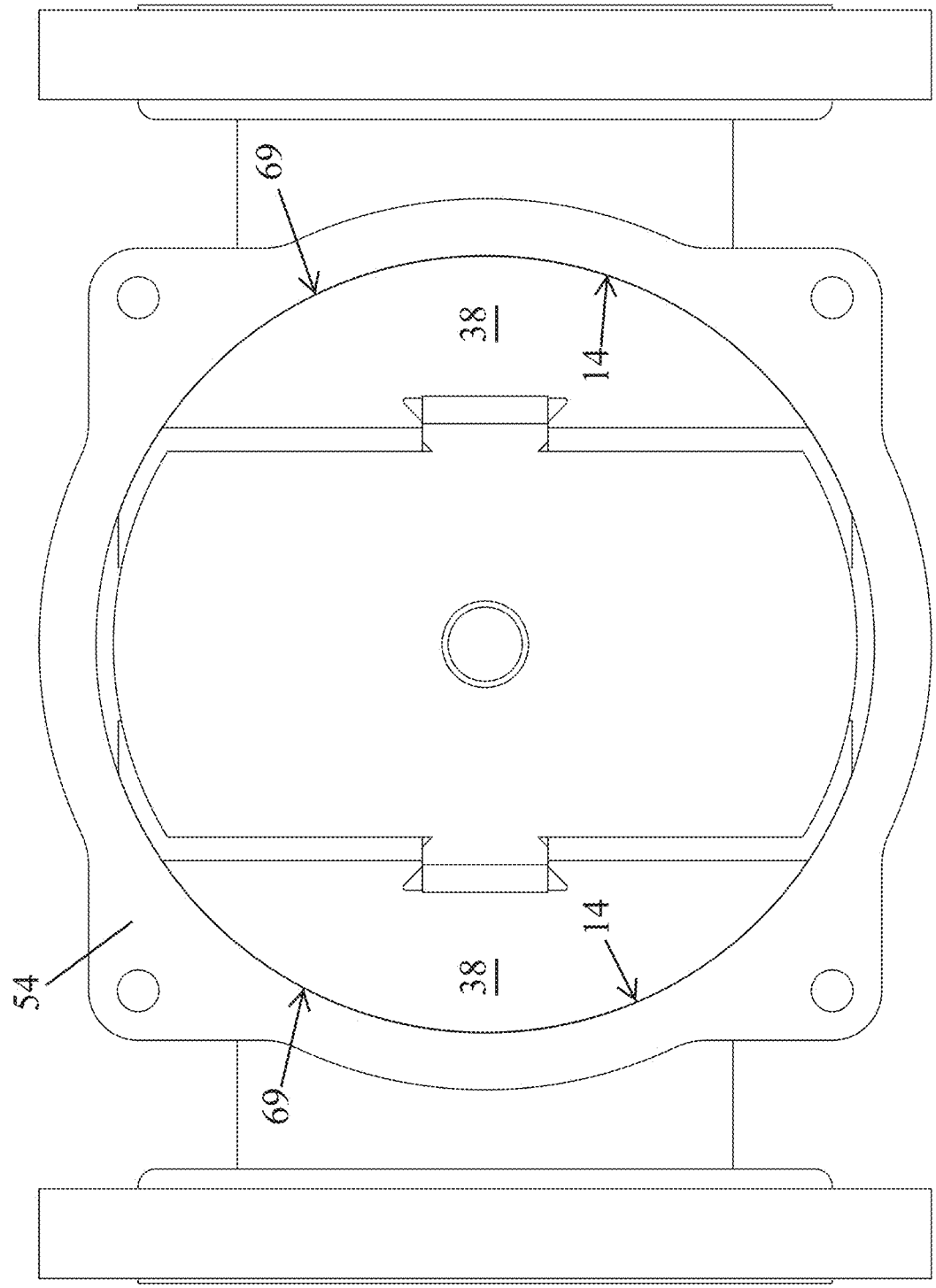

FIG. 5D shows the valve in the closed position, the face 14 of the seats 38 is in full metal to metal contact with the valve body 54 and the seal (not shown) is fully compressed against the body bore 69 creating a leak proof communication, i.e., a bubble tight seal.

Figure 6A:
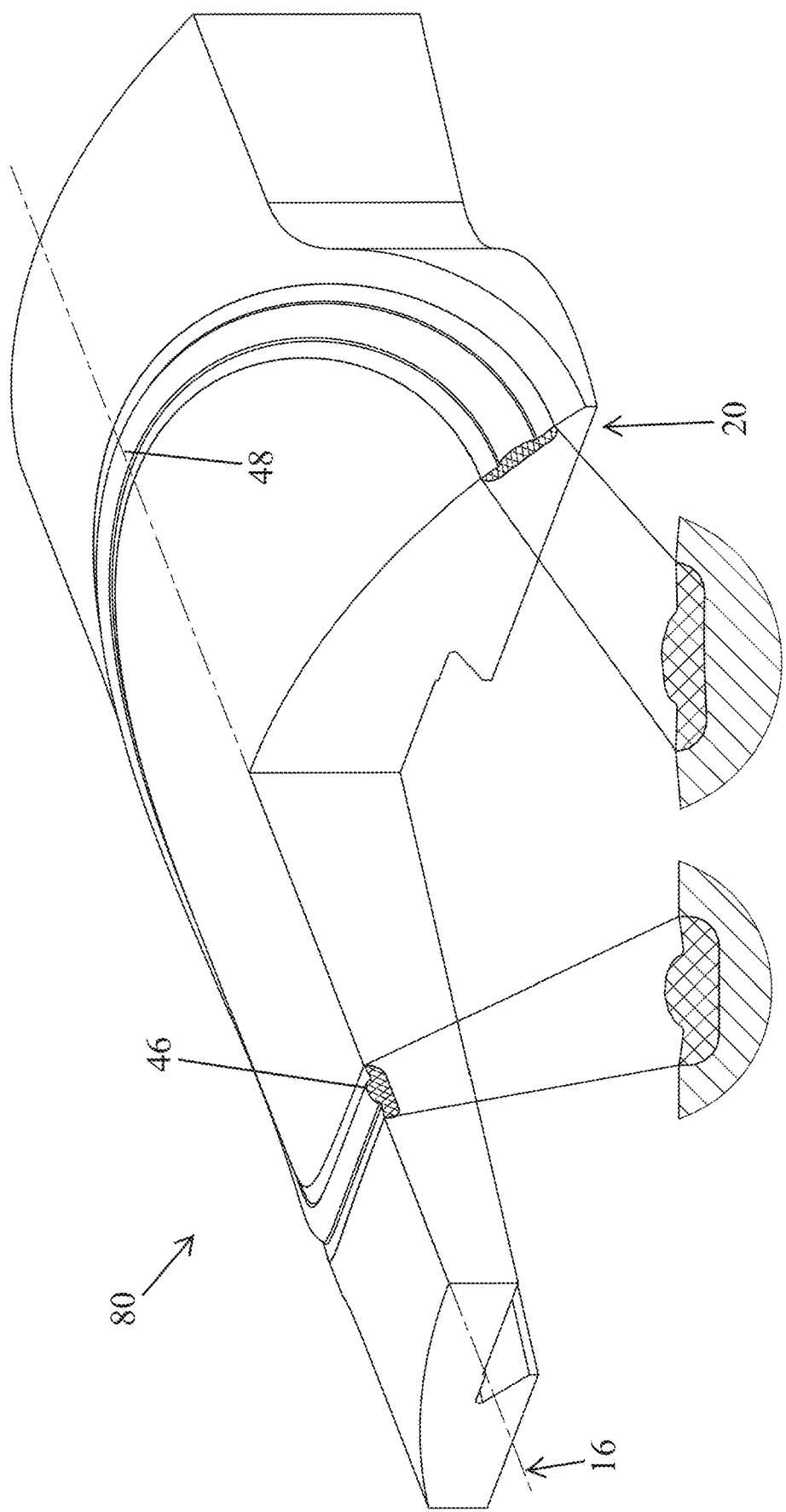
FIGS. 6A-6C show isometric cross-sectional views of the seal height and seal width in various embodiments of the invention.
Figure 6B:
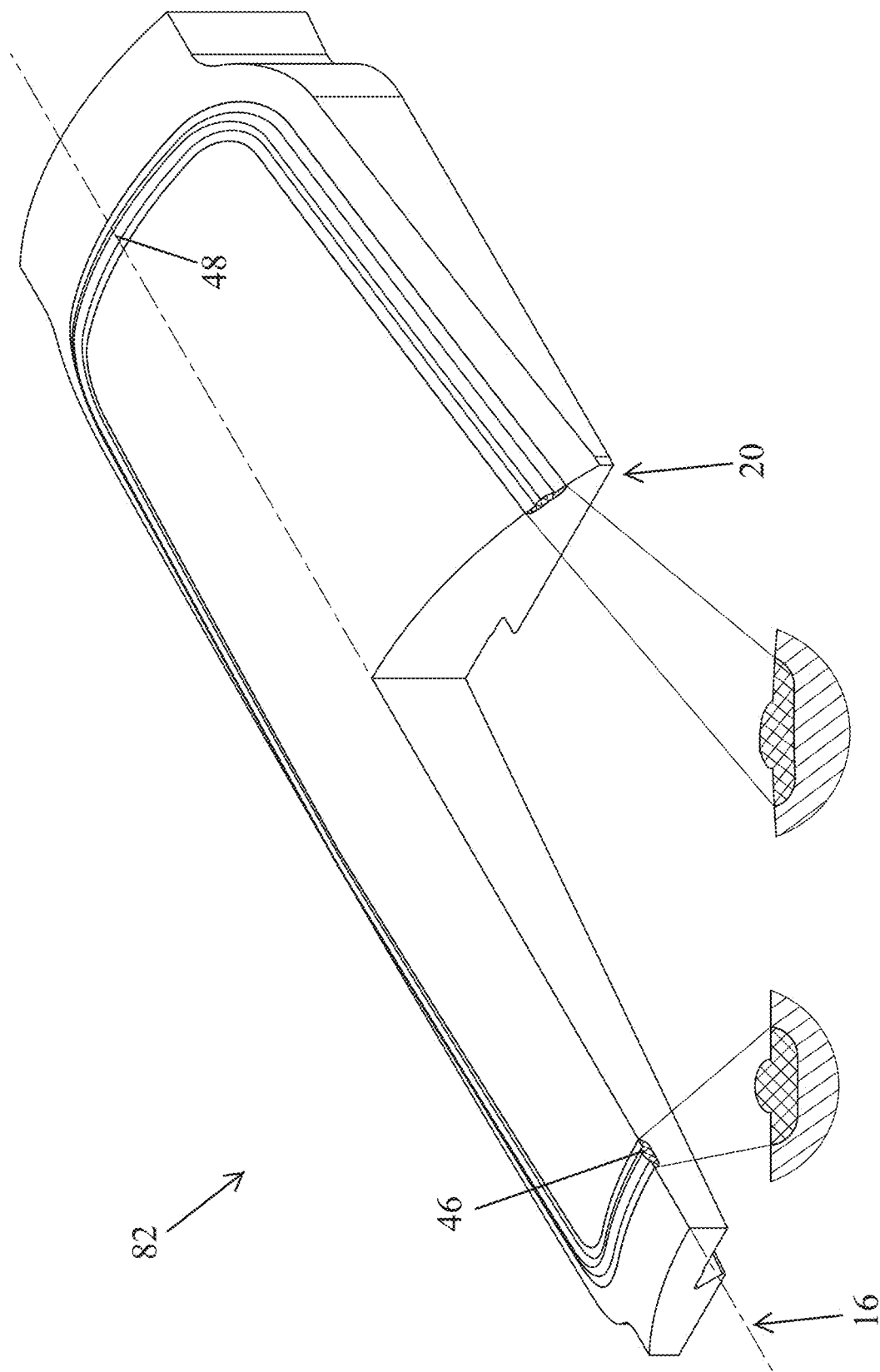
Figure 6C:
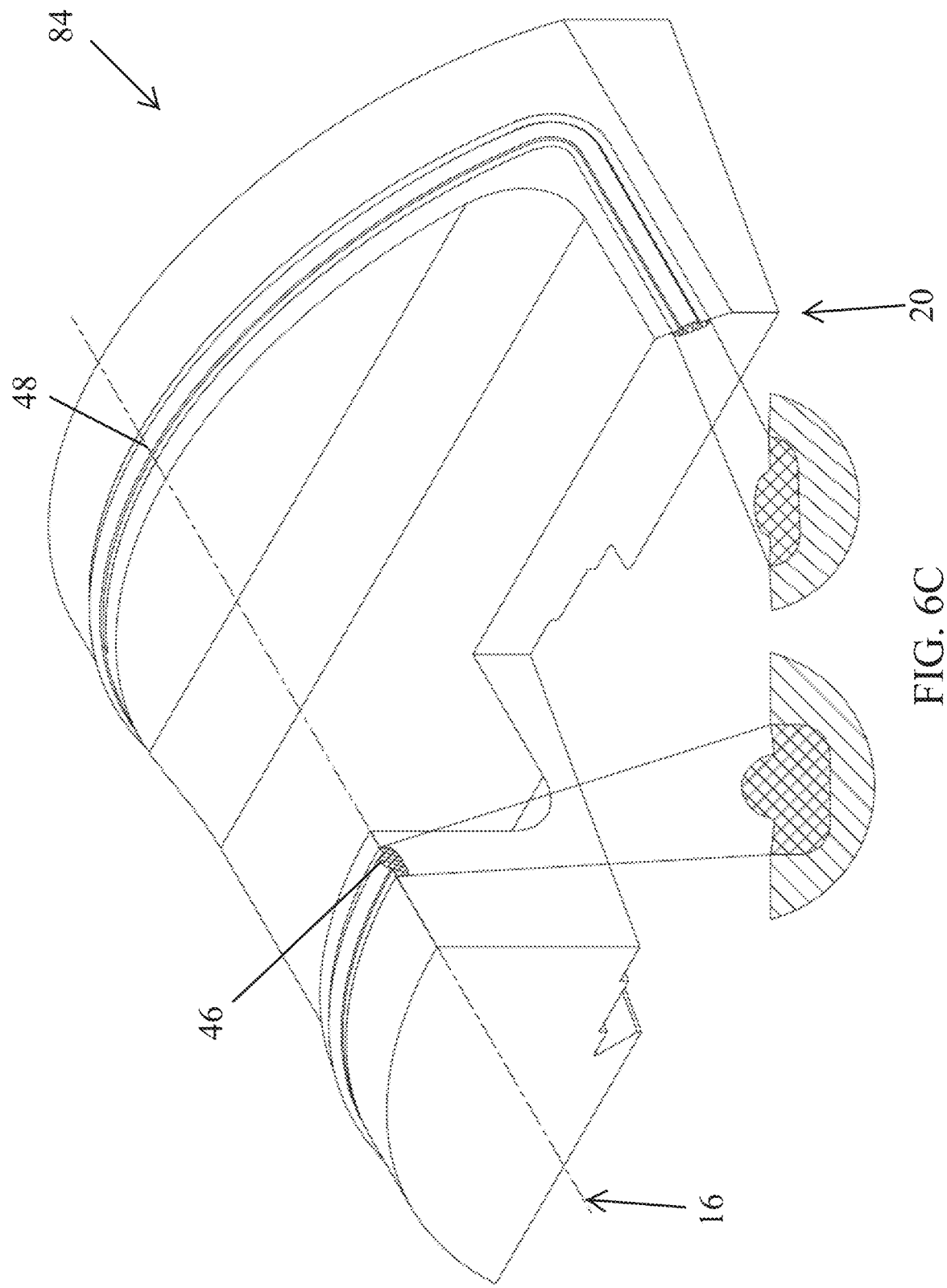

FIGS. 6A-6C show various cut away views of the seal protrusion height and seal protrusion width in various embodiments of the invention. FIG. 6A is a round seat 80, FIG. 6B is a Venturi seat 82, and FIG. 6C is a four-way diverter seat 84. In all embodiments the seal protrusion heights are greatest at the top seal intersection 46 and bottom seal intersection 48 with the core centerline 16 and shortest at the extreme exposed edge 20 and extreme covered edge (not shown). Table 3 shows seal protrusion height for various size and pressure class round, venturi, and 4-way seats. Furthermore, in all embodiments, the seal protrusion widths are most narrow top seal intersection 46 (see detail) and bottom seal intersection 48 with the core centerline 16 and widest at the extreme exposed edge 20 (see detail) and extreme covered edge (not shown). Table 4 shows seal width for various size and pressure class round, venturi, and 4-way seats. Furthermore, the seal protrusion heights continuously and synchronously decrease as you progress clockwise along the seal path from the top seal intersection 46 and bottom seal intersection 48 to the extreme exposed edge 20 and extreme covered edge (not shown), where the seal protrusion heights are at their smallest. The seal widths continuously and synchronously increase in width as you move clockwise along the seal path from the top seal intersection 46 and bottom seal intersection 48 with the core centerline 16 to the extreme exposed edge 20 and extreme covered edge (not shown), where the seal widths are at their widest.

TABLE 2

Seal protrusion heights of various sizes and pressure class seats. All values in inches.

| | | Venturi | | | | | |
|---|---|---|---|---|---|---|---|
| | | T2"abc | T3"abc | T4"abc | T8"ab | T10"ab | T12"a |
| Seal Height | At Seal Centerline | 0.04 | 0.04 | 0.04 | 0.06 | 0.06 | 0.06 |
| | At Extreme covered & exposed edge | 0.03 | 0.04 | 0.04 | 0.04 | 0.05 | 0.05 |
| Seal Height Taper | | 0.01 | 0.01 | 0.00 | 0.02 | 0.01 | 0.01 |

TABLE 2-continued

| | | Round | | | | | |
|---|---|---|---|---|---|---|---|
| | | H3"de | H4"d | H6"cd | H8"c | H10"c | H12"c |
| Seal Height | At Seal Centerline | 0.05 | 0.05 | 0.06 | 0.06 | 0.06 | 0.06 |
| | At Extreme covered & exposed edge | 0.04 | 0.04 | 0.04 | 0.05 | 0.05 | 0.05 |
| Seal Height Taper | | 0.01 | 0.01 | 0.02 | 0.01 | 0.01 | 0.01 |

| | | 4-Way | | | |
|---|---|---|---|---|---|
| | | W2"abc | W4"abcd | W6"abcd | W8"abcd |
| Seal Height | At Seal Centerline | 0.08 | 0.10 | 0.10 | 0.10 |
| | At Extreme covered & exposed edge | 0.04 | 0.05 | 0.05 | 0.04 |
| Seal Height Taper | | 0.04 | 0.05 | 0.05 | 0.06 |

TABLE 4

Seal width of various sizes pressure class seats.
All values in inches.

| | | Venturi | | | | | |
|---|---|---|---|---|---|---|---|
| | | T2"abc | T3"abc | T4"abc | T8"ab | T10"ab | T12"a |
| Seal Width | At Seal Centerline | 0.13 | 0.16 | 0.16 | 0.20 | 0.21 | 0.22 |
| | At Extreme covered & exposed edge | 0.16 | 0.19 | 0.19 | 0.25 | 0.27 | 0.27 |
| Seal Width Taper | | 0.03 | 0.03 | 0.03 | 0.05 | 0.06 | 0.05 |

| | | Round | | | | | |
|---|---|---|---|---|---|---|---|
| | | H3"de | H4"d | H6"cd | H8"c | H10"c | H12"c |
| Seal Width | At Seal Centerline | 0.21 | 0.20 | 0.22 | 0.23 | 0.24 | 0.25 |
| | At Extreme covered & exposed edge | 0.25 | 0.25 | 0.28 | 0.30 | 0.30 | 0.32 |
| Seal Width Taper | | 0.04 | 0.05 | 0.06 | 0.07 | 0.06 | 0.07 |

| | | 4-Way | | | |
|---|---|---|---|---|---|
| | | W2"abc | W4"abcd | W6"abcd | W8"abcd |
| Seal Width | At Seal Centerline | 0.15 | 0.25 | 0.25 | 0.20 |
| | At Extreme covered & exposed edge | 0.15 | 0.25 | 0.25 | 0.20 |
| Seal Width Taper | | 0.00 | 0.00 | 0.00 | 0.00 |

FIGS. 7A-7D show examples of shrink, compression set, and sink due to shrink and set at different locations along the seal path. The inventors designed the nesting voids 98 by taking advantage of two elastomeric properties; firstly, shrink and secondly, compression set or set. Shrink is a phenomenon within the polymer industry where uncured rubber molded at high temperatures and pressures decreases in volume as it vulcanizes. Set is the process whereby cured rubber does not fully rebound after it is compressed for the first time. Sink is the combined effect of shrink and set. Incorporating shrink and set into the nesting void design, allows the nesting voids 98 to have smooth concave recesses that resist destructive flow forces including but not limited to cavitation and powerwashing, especially present at elevated operating pressures and resultant flow rates.

Figure 7A:
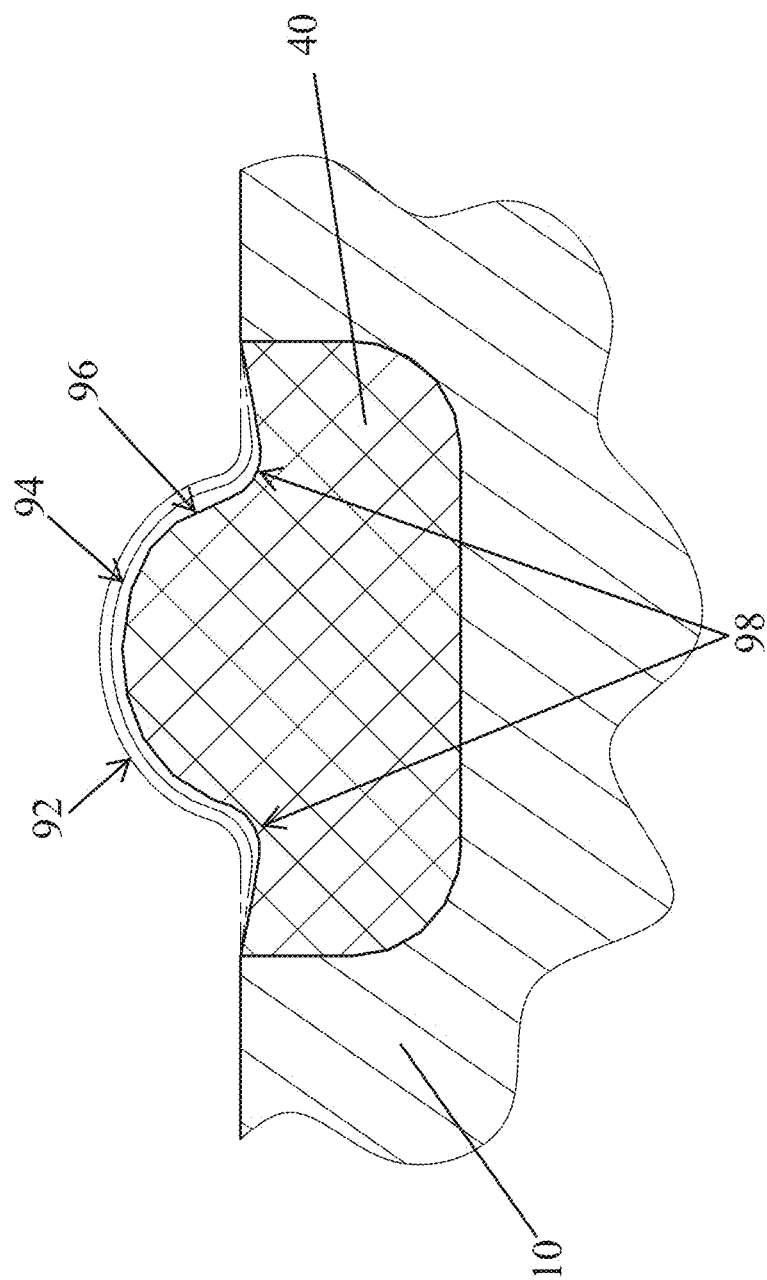
FIGS. 7A-7D show how shrink, set, and sink are utilized to create nesting voids along the seal path.
Figure 7B:
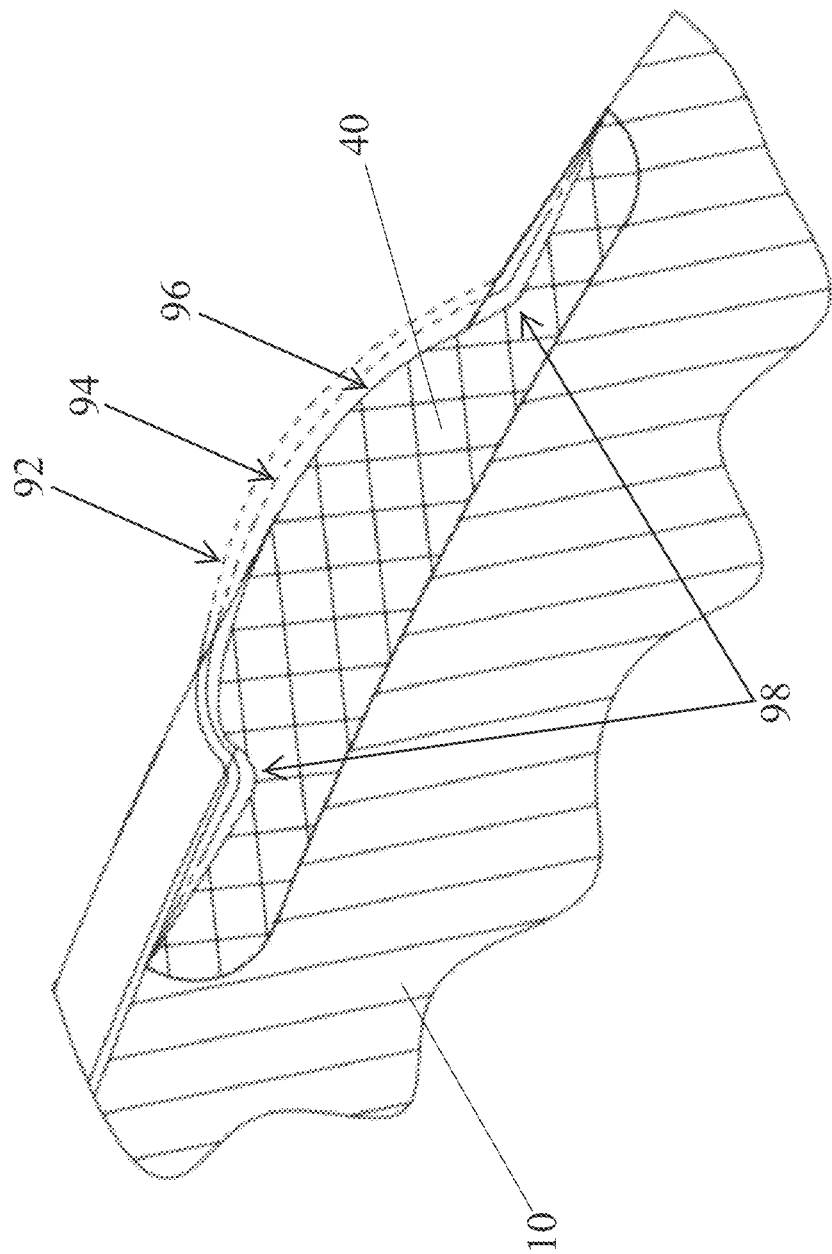

FIG. 7A shows a cross-section view of the seal 40 disposed within the core 10 at top seal intersection with the core centerline (not shown), where the seal protrusion height is tallest and seal protrusion width is most narrow. FIG. 7B shows a cross-section view of the seal 40 at the extreme edge where the seal protrusion height is shortest, and the seal protrusion width is most wide. Referring to both FIGS. 7A and 7B, prior to bonding, an excessive amount of elastomer is placed into the groove, the core with the unbonded elastomer is put into a mold and cured with high temperature and pressure. As the curing process progresses, the elastomer is in communication and is thereby bounded and formed with the mold 92. During vulcanization, the elastomer decreases in volume and cures to a height and width indicated by the shrink 94 outline. After cure and once installed into a valve, the seat is cycled closed where the seal 40 goes through the phenomenon known as set. The final height and width of the seal 40 after shrink and set is indicated by sink 96 which is the outline of the seal 40. The nesting voids 98 is where the seal protrusion is compressed into upon seating.

Figure 7C:
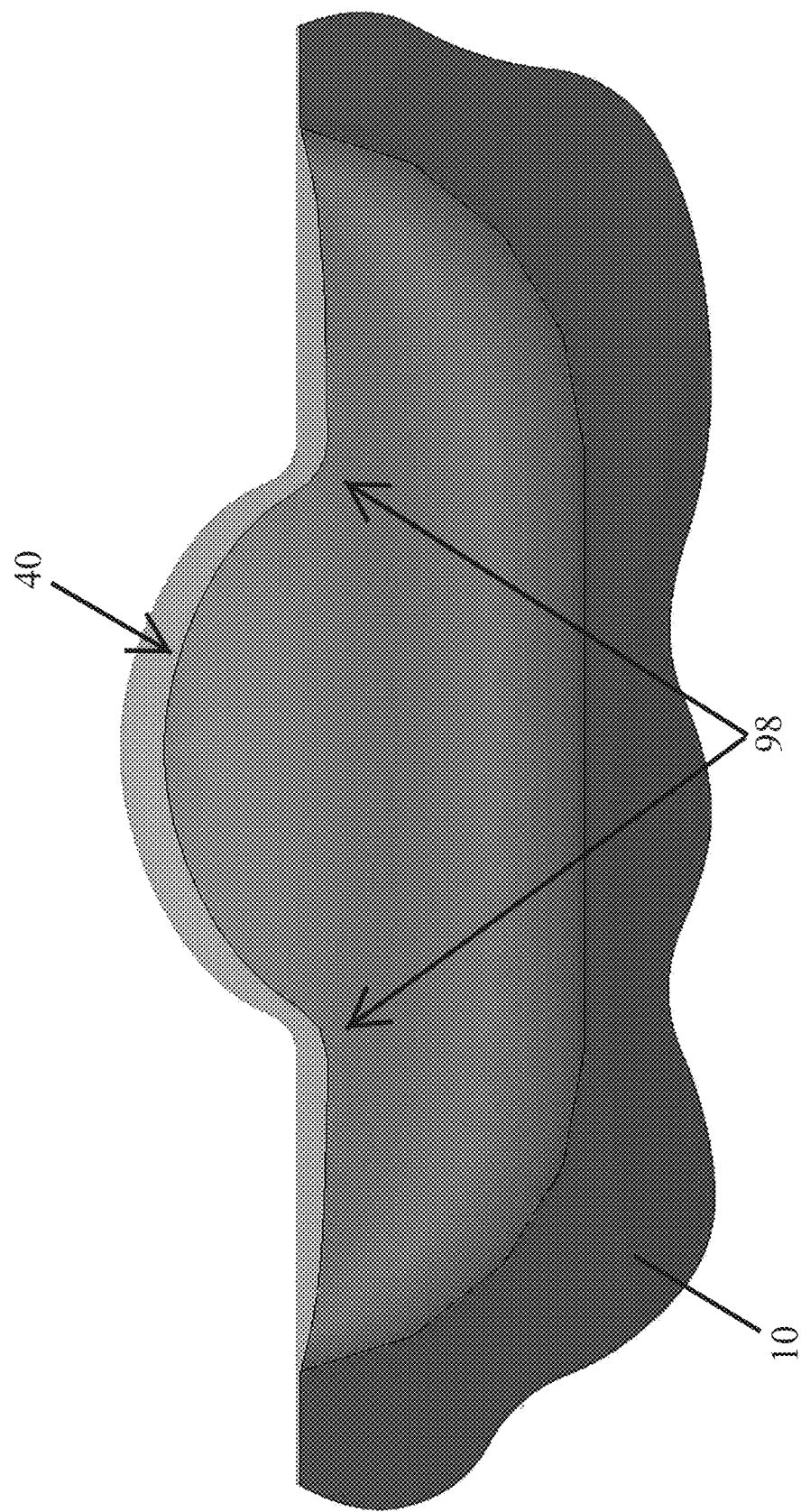
Figure 7D:
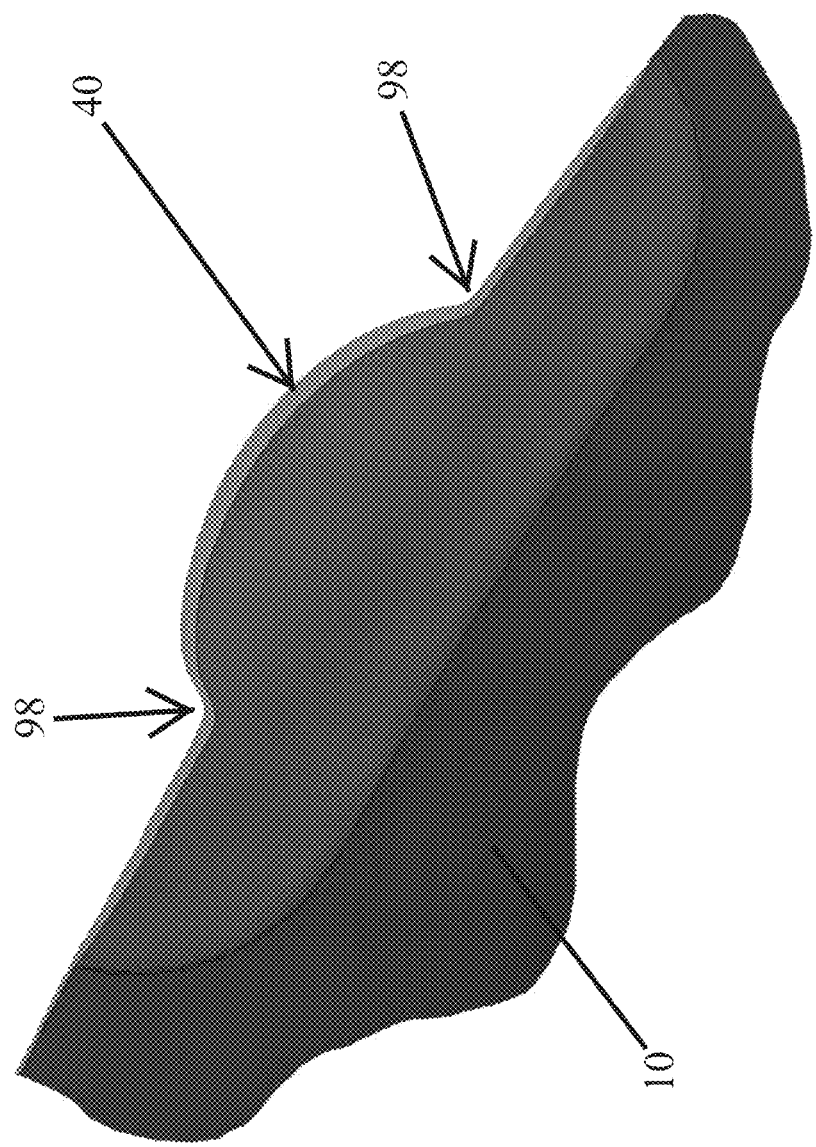

FIG. 7C shows a finite element analysis of the seal 40, after cure, disposed within the core 10 at the top seal intersection with the core centerline, where the seal protrusion height is tallest and seal protrusion width is most narrow. FIG. 7D shows a finite element analysis of the seal 40, after cure, disposed within the core 10 at the extreme edges where the seal protrusion height is shortest and seal protrusion width is most wide.

The finite element analysis of the seal 40 post cure visually shows the shrink and set forces acting on the seal 40. The seal 40 is bonded to the seat, specifically to the seal bed within the groove. The seal bond with the seat is stronger than the shrink and set forces acting on the seal 40. Therefore, when the shrink and set forces act on the bonded seal 40, the shrink and set forces pulls the unbonded, surface, portion of the seal 40 towards the seal bed, this in turn creates a nesting void 98 due to the sink of the seal 40 towards the seal bed. FIGS. 7C and 7D, in the green shaded region shows residual increased stress as compared to the highest point of the seal, shown in orangish-yellow. Because the bond between the elastomer and the seal bed is stronger than the shrink and set forces, the seal 40 can only sink in one direction, inward towards the seal bed, creating a nesting void 98 caused by the sink of the seal surface due to shrink and set. Utilizing shrink and set in the stress relief approach makes the seal a significantly stouter seal bed, providing improved transverse stiffness. The stouter seal can exert significantly more gasket force against the valve body than traditional seals with molded or cut-in undercut voids.

The inventors determined the elastomer's shrink and subsequent sink of molded height of the seal 40 is about 15-20% of its molded height with a volume ratio of A/a=4 of 25%. Allowing for a swell of 25% the ratio was increased to A/a=5 or 20%.

In some embodiments, the molded heights of the seal have been increased by 1 to 1.5 times greater than the desired finished seal protrusion height to account for shrink and compression set.

In a more preferred embodiment, the molded seal protrusion heights are enlarged 1.1 to 1.2 times greater than the desired finished seal protrusion height.

The seal protrusion width to height ratio is determined by considering the flow rate and working pressure potential to minimize and optimize transverse stiffness. For lower pressure, 150-300 pound, and flow rate elongated seats, the seal protrusion width was designed to 3.2 to 4.0 times wider than the seal protrusion height. For high pressure, 600-1500 pound, and flow rate round seats, the seal protrusion width was designed to be is to be 3.7 to 4.3 times wider than the seal protrusion height. For 4-way diverter seats, the seal protrusion width was designed to be 0 to 1.6 times wider than the seal protrusion height.

The seal cross sectional area "a", half of an ellipse, is determined by the equation: $w/2 \times h \times \pi \times 0.5$, where seal protrusion width is "w" and final seal protrusion height is "h".

The depth of the groove "D" should be 2.0 to 2.5 times the height of the seal "h". In a more preferred embodiment, the depth of the groove should be 2.1 to 2.3 times the height of the seal.

The groove width "W" is the seal protrusion width "w"+50% on each side or 2W plus 5-10% fit up tolerance per side or "2.1W".

For a full radius inside corner, the groove area can be determined by the equation: $A = W \times D - 0.43 \times D \times D$, where "A" is groove area, "W" is groove width, and "D" is groove depth.

To ensure the groove area "A" can accept seal area "a" after sink, i.e., shrink and set, the inventors determined that the groove area "A" needs to be 5 times bigger than the seal area "a". This provides sufficient stress relief nesting voids, allowing the seal area "a" to move into the groove area "A" recess, thus fire safe metal to metal seat and valve body contact will be attainable. The inventors also determined that the shrink & set seal protrusion height multiplier is 1.16. To determine the seal offset, which is also the molded seal protrusion height, the desired seal protrusion height "h" is multiplied by the shrink & set seal protrusion height multiplier. The molded seal protrusion width is the same as seal protrusion width "w" as it has been determined that widthwise shrinkage does not affect performance.

Figure 8D:
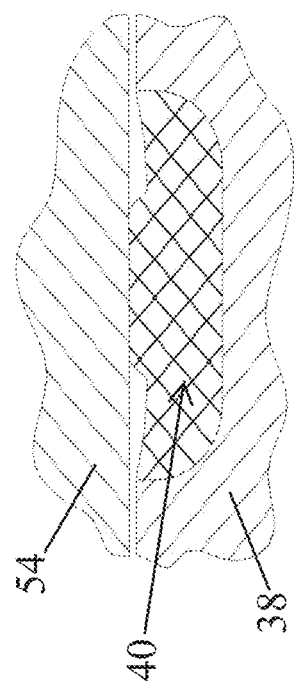
FIGS. 8A-8F show a cross-section at the top and bottom centerline and the seals response during seating.
Figure 8E:
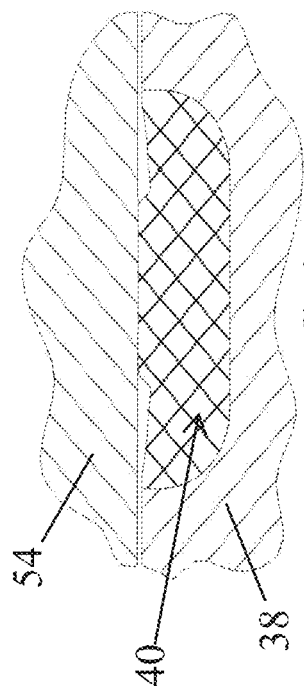
Figure 8F:
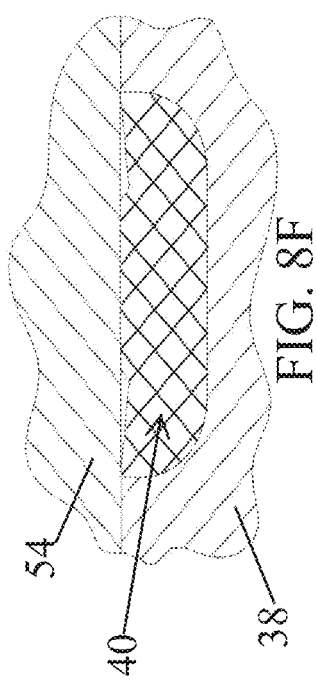
Figure 8A:
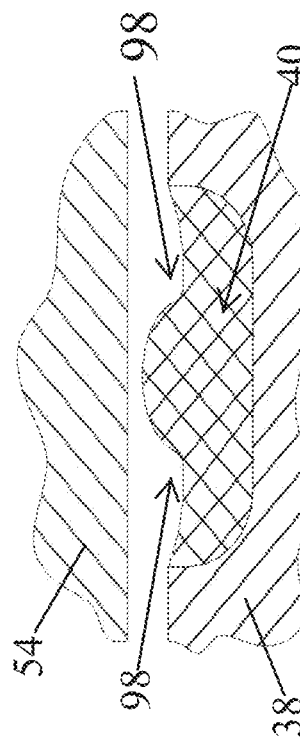
Figure 8B:
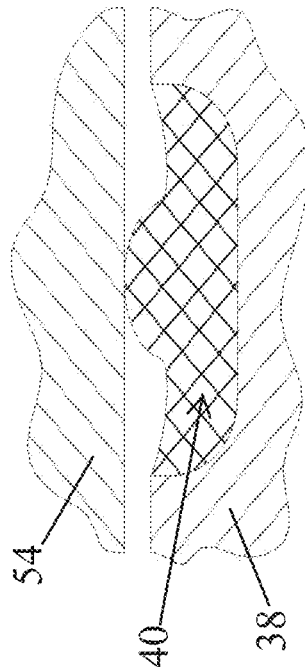
Figure 8C:
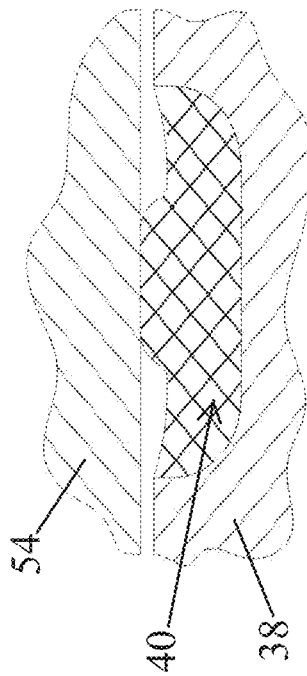

FIGS. 8A-8E show the seal compressing during various stages of seating. FIGS. 8A-8E show a cross-section view of seal 40 at top seal intersection with the seat centerline, where the seal protrusion height is tallest and seal protrusion width is most narrow. The figures show the sequential seating of the seal 40 against the valve body 54. FIG. 8A is the initial contact between the seal 40 and the valve body 54. As shown by FIGS. 8B-8C, the seat 38 progressively moves towards the valve body 54, one will notice the incompressible seal 40 is displaced from its original modified ellipse shape and begins to fill the nesting voids 98 created by shrink, set, and sink. The nesting void area is equivalent to the area of the seal protrusion, during max seal swell, allowing the nesting void 98 to be substantially filled when the seat 38 is completely seated against the valve body 54 as shown by FIG. 8E.

FIG. 9 shows an embodiment of the seal profile above the seat face 14. The seal 40 is generally elliptical in cross-sectional shape. FIG. 9A is a cross-sectional view representative of the seal 40 intersection at the top and bottom centerlines, the seal shape is a true ellipse with equal seal protrusion area on both sides of the seal base centerline 104. The seal is symmetrical about the seal base centerline 104. The seal base is the where the seal protrusion crosses the plane of the seat face. Furthermore, in FIG. 9A, the seal base centerline is also the seal centerline and the groove top centerline, the groove top is where the groove crosses the plane of the seat face. One will notice the seal base centerline 104 intersects the first contact point 106 between the valve body and the seal protrusion during valve closing. When the valve is in the fully seated position the first contact point 106 and the last contact point 108 are in the same position maintaining the equal cross-sectional seal area on each side of the seal base centerline 104. FIG. 9B is representative of the prior art, which is a cross-sectional view showing a true ellipse seal profile 40 at the extreme exposed and covered edges. One will notice the seal base centerline 104 does not intersect the first contact point 106 between the valve body and the seal protrusion during valve closing. The first contact is made between the valve body and seal protrusion downward, or outward, of the seal base centerline 104. This causes excess strain on the seal due to the unequal seal protrusion cross-sectional area on either side of the first contact point 106 and additional cross-sectional seal area being pushed outward of the seal base centerline 104 when the valve is in the fully seated position. This is shown by the first contact point 106 and the last contact point 108 are in the same position in the fully seated position. FIG. 9C is a cross-sectional view of the current art showing the modified ellipse seal profile at the extreme exposed and covered edges. It should be noted that the seal shape is a modified ellipse. The inboard seal edge 100 is the edge of the seal 40 closest to the seat centerline and furthest from the seat edge. The outboard seal edge 102 is the edge of the seal 40 closest to the seat edge and furthest from the seat centerline. The inboard seal edge 100 of the seal protrusion has additional cross-sectional area than a true ellipse, this can be seen by comparing the cross-sectional area to the left and right of the seal base centerline. The outboard seal edge 102 of the seal protrusion is sloped towards the seal base centerline 104 such that the cross-sectional area or unit volume is ~10% less than the cross-sectional area or unit volume of a true ellipse at the top and bottom centerlines and ~15% less than the cross-sectional area or unit volume of the interior half of the seal at the exposed and covered edges. The outboard seal edge 102 asymmetrical by amount equal to amount of uphill push, the triangle formed by the first contact point 106, the last contact point 108, and the perpendicular seal centerline 110 in FIG. 9B) thereby shifting the first and last contact points back onto the seal base centerline 104.

Further in FIG. 9C, and like FIG. 9A, the seal base centerline 104 intersects the first contact point 106. When the valve is in the fully seated position the first contact point 106 and the last contact point 108 are in the same position maintaining the equal cross-sectional seal area on each side of the seal base centerline 104 even with the tilting of the seal due to the shape of the seal at the extreme and covered edges. In other words, the cross-sectional seal area is equal on both sides of the seal base centerline 104 and the first contact point 106 is on the seal base centerline 104 even at the extreme covered and exposed edges.

The modified ellipse profile gives the seal two significant attributes. The first attribute is evident during seating of the valve. As the seal engages the valve body 54 and the valve is seated, metal-to-metal contact is made, the additional area of the inboard seal edge 100 is shifted towards the outboard seal edge 102, maintaining the seal base centerline 104 as the center of the seal contact patch with the valve body 54. The result is equal compression of the seal protrusion into the nesting voids 98 even on the extreme exposed and covered edges. If the seal were a true ellipse, with equal inboard and outboard seal edge areas, at all points along the seal path, during seating the inboard seal edge would shift towards the outboard seal edge. In the full seated position, the outboard seal edge area would be greater than the inboard seal edge area, effectively shifting the center of the contact patch between the seal and the valve body outward towards the seat edge. This outward shift of the contact patch decreases the sealing effectiveness. The second attribute is evident during removal of the seat from the mold, the sloped outboard seal edge is less likely to interfere with the mold during removal thus avoiding damage to the outboard seal edge and bond where the interference of the mold and elastomer would occur.

In certain embodiments the modified ellipse profile has a one (1) to ten (10) degree draft inward towards the seat centerline 104 on both the inboard and outboard seal edges. In a more preferred embodiment, the modified ellipse profile has a three (3) to five (5) degree draft inward towards the seat centerline 104 on both the inboard and outboard seal edges. The inward draft of the modified ellipse is at its greatest at the extreme covered and exposed edges and is centerline symmetrical. The true ellipse at the top and bottom centerline intersections does not have an inward draft. The inward draft decreasingly tapers constantly and consistently from its maximum at the extreme covered and exposed edges to its minimum at the top and bottom centerline intersections.

As one can appreciate, FIG. 9A shows the symmetrical ellipse shaped seal protrusion, from the top and bottom centerline intersection, approaching the valve body perpendicularly, the seal protrusion compresses and bulges laterally equally along the seal centerline into the nesting voids. However, in FIG. 9B, one will notice at the extreme covered and exposed edges, a true elliptical shaped seal protrusion would compress and bulge unequally along the seal centerline, favoring the outward or downhill nesting void 106, due to non-perpendicular approach of the seal protrusion to the valve body. As shown by FIG. 9C, the new art, by employing the inward draft resulting in a modified ellipse shape, discussed above, the cross-sectional area of the outboard seal edge 102 is reduced. Due to the constant cross-sectional seal protrusion area design, the cross-sectional area of the inboard or uphill side of the seal edge 100 must be increased. With the increased area on the inward seal protrusion, the seal protrusion will now compress and bulge equally along the seal base centerline 104 into the nesting voids.

Figure 10A:
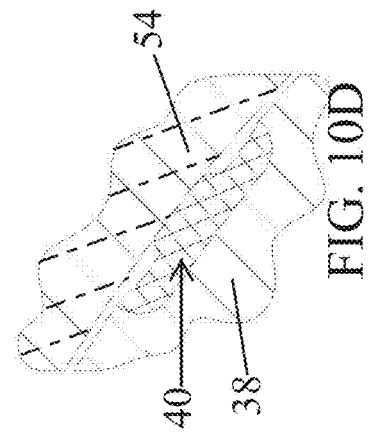
FIGS. 10A-10F show a cross-section at the extreme covered and exposed edges and the seals response during seating.
Figure 10B:
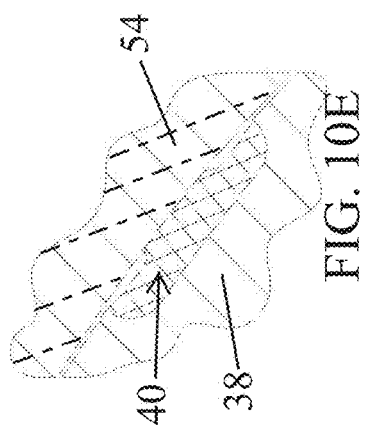
Figure 10C:
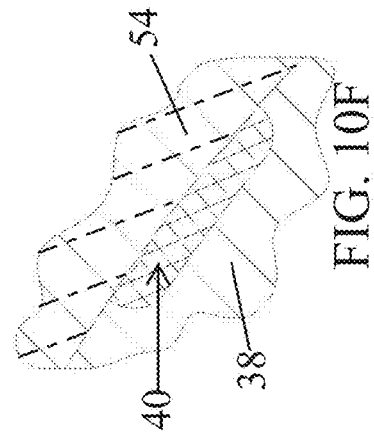
Figure 10D:
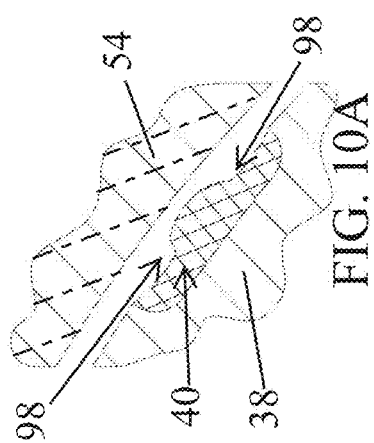
Figure 10E:
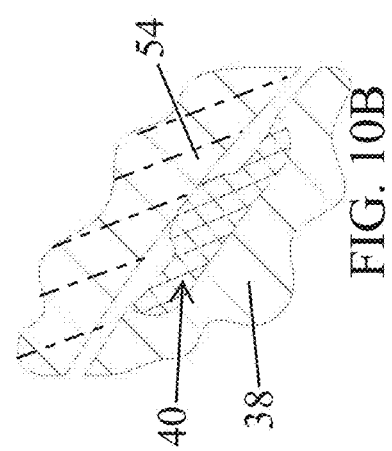
Figure 10F:
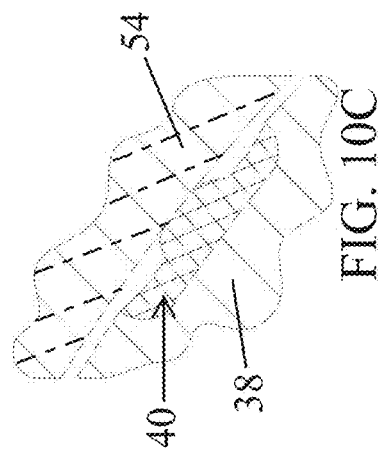

FIGS. 10A-10E show a cross-section view of the seal 40 at the extreme edges where the seal protrusion height is shortest, and width is most wide. The figures show the sequential seating of the seal 40 against the valve body 54. FIG. 10A is the initial contact between the seal 40 and the valve body 54. As shown by FIGS. 10B-10E, the seat 38 progressively moves towards the valve body 54, one will notice the incompressible seal 40 is displaced from its original modified ellipse shape and begins to fill the nesting voids 98 created by shrink, set, and sink due to shrink. The nesting void area is equivalent to the area of the seal protrusion allowing the nesting void 98 to be completely filled when the seat 38 is fully seated against the valve body 54 as shown by FIG. 10E.

It will be understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited features, elements, components, groups, integers, and/or steps, but do not exclude the presence of other unstated features, elements, components, groups, integers and/or steps. In embodiments of any of the compositions and methods provided herein, "comprising" may be replaced with "consisting essentially of" or "consisting of". As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only. As used herein, the phrase "consisting essentially of" requires the specified features, elements, components, groups, integers, and/or steps, but do not exclude the presence of other unstated features, elements, components, groups, integers and/or steps as well as those that do not materially affect the basic and novel characteristic(s) and/or function of the claimed invention.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A seal for a valve seat for use in a plug valve, the seal comprising:
   a bonded side, a seat face side opposite the bonded side;
   a seal path that substantially follows a valve seat shape;
   a seal protrusion on the seat face side and a seal substructure on the bonded side; the seal protrusion having a variable height and a variable width along the seal path.

2. The seal according to claim 1, wherein the seal protrusion is generally elliptical in cross-sectional shape.

3. The seal according to claim 1, wherein a seal protrusion height is greatest at a top centerpoint and a bottom centerpoint of the valve seat.

4. The seal according to claim 1, wherein the seal width is most narrow at a top centerpoint and a bottom centerpoint of the valve seat.

5. The seal according to claim 1, wherein a seal protrusion width is widest at an extreme exposed edge and an extreme covered edge of the valve seat.

6. The seal according to claim 1, wherein the seal has a constant cross-sectional area at all points about the seal path.

7. The seal according to claim 1, wherein the seal is symmetrical about a valve seat centerline.

8. The seal according to claim 1, wherein the seal substructure has a width, a seal substructure width varies inversely with a seal protrusion height at all points along the seal path.

9. The seal according to claim 1, wherein the seal protrusion simultaneously contacts a valve body at all points along the seal path during seating.

10. The seal according to claim 1, wherein the seal protrusion simultaneously disengages from a valve body at all points along the seal path during unseating.

11. The seal according to claim 1, wherein the seal protrusion has a modified ellipse cross-sectional profile with a three-to-five-degree inward draft towards a seal centerline at extreme covered and exposed edges.

12. The seal according claim 1, wherein the seal protrusion has a true ellipse cross-sectional profile at a seal path intersection with top and bottom centerpoints.

13. The seal according to claim 1, further comprising the seal bonded to the valve seat.

14. The seal according to claim 1, wherein the seal protrusion height is lowest at an extreme exposed edge and an extreme covered edge of the valve seat.

15. The seal according to claim 14, wherein the seal protrusion height decreases at a constant rate from top and bottom centerpoints toward the extreme exposed and extreme covered edges.

16. The seal according to claim 1, wherein the seal is formed from an elastomer.

17. The seal according to claim 16, wherein the elastomer is one of Viton™ GF-600S, Viton™ Extreme ETP-600S, Viton™ GFLT-600S, DYNEON PFE40Z®, Kalrez®, FKM (fluoroelastomer), or FFKM (perfluoroelastomer).

18. A plug valve seat assembly comprising:
a valve seat having a plug communication side and a valve body communication side,
the valve body communication side having top and bottom centerpoints and an extreme exposed edge and an extreme covered edge;
a seat face on the valve body communication side of the valve seat;
a seal received within a groove, the groove disposed within the seat face on the valve body communication side and forming a seal path substantially following a valve seat shape;
a seal protrusion on the valve body communication side and a seal substructure bonded within the groove;
wherein the seal path intersects the top and bottom centerpoint and the extreme exposed and covered edges;
wherein the seal protrusion has a variable height and a variable width along the seal path;
wherein the groove has a variable depth below the seat face and a variable width along the seal path.

19. The seat assembly of claim 18, wherein the valve seat is one of round, venturi, or 4-way.

20. The seat assembly of claim 18, wherein the seal protrusion has a modified ellipse cross-sectional profile with a three-to-five-degree inward draft towards a seal centerline at the covered and exposed edges.

21. The seat assembly of claim 18, wherein the seal protrusion has a true ellipse cross-sectional profile at an intersection with the top and bottom centerpoint.

22. A method of simultaneously sealing a plug valve along an entire seal path, the plug valve body including a pair of seats each seat having a seal, the method comprising the steps of
forming a bubble tight seal to withstand a working pressure of a medium acting upon the pair of seats when the plug valve is in a seated position, the seal formed by a seal protrusion with a constantly varying normal height and width and is symmetrical about a seat centerline;
wherein each seal protrusion has a seal protrusion height that tapers from the valve seat centerline to an edge height, as each seal protrusion extends from upper and lower seal segments simultaneously to covered and exposed edges;
wherein each seal protrusion has a seal protrusion width that tapers from an edge width to the valve seat centerline; as each seal protrusion extends from the covered and exposed edges simultaneously to the upper and lower seal segments.

* * * * *